United States Patent
Ebine et al.

(10) Patent No.: US 8,597,823 B2
(45) Date of Patent: Dec. 3, 2013

(54) BATTERY, VEHICLE USING THE BATTERY, AND BATTERY MANUFACTURING METHOD

(75) Inventors: Yoshiaki Ebine, Aichi-ken (JP); Tetsushi Watari, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 731 days.

(21) Appl. No.: 12/519,596

(22) PCT Filed: Dec. 18, 2007

(86) PCT No.: PCT/JP2007/074779
§ 371 (c)(1),
(2), (4) Date: Jun. 17, 2009

(87) PCT Pub. No.: WO2008/078724
PCT Pub. Date: Jul. 3, 2008

(65) Prior Publication Data
US 2010/0028759 A1   Feb. 4, 2010

(30) Foreign Application Priority Data

Dec. 26, 2006  (JP) ................................. 2006-350060

(51) Int. Cl.
*H01M 2/00* (2006.01)
*H01M 4/82* (2006.01)

(52) U.S. Cl.
USPC ................. 429/163; 429/52; 429/53; 429/56; 429/171; 429/175; 429/186; 29/623.1

(58) Field of Classification Search
USPC ............... 429/53, 163, 186, 52, 56, 171, 175; 29/623.1
See application file for complete search history.

(56) References Cited

U.S. PATENT DOCUMENTS

| | | | |
|---|---|---|---|
| 6,210,825 B1 * | 4/2001 | Takada et al. | 429/56 |
| 6,255,013 B1 * | 7/2001 | Marukawa et al. | 429/82 |

FOREIGN PATENT DOCUMENTS

| | | |
|---|---|---|
| JP | 9-7557 | 1/1997 |
| JP | 9-259841 | 10/1997 |
| JP | 2000-21365 | 1/2000 |
| JP | 2001-155698 | 6/2001 |
| JP | 2002-184365 | 6/2002 |
| JP | 2003-17029 | 1/2003 |
| JP | 2004-39445 | 2/2004 |
| JP | 2006-324160 | 11/2006 |

OTHER PUBLICATIONS

JP 2001-155698 (machine translation).*
JP 2001-155698 (partial translation).*

* cited by examiner

*Primary Examiner* — Patrick Ryan
*Assistant Examiner* — Alex Usyatinsky
(74) *Attorney, Agent, or Firm* — Finnegan, Henderson, Farabow, Garrett & Dunner, LLP

(57) ABSTRACT

A battery includes: a first member having an opening a housing space which houses a generation element; and a second member which closes the opening of the first member. The first member and the second member have welded portions which are welded to each other. A groove which can receive a part of molten metal MM generated upon welding is formed in a channel between the first and the second member, i.e., from the welded portion to the housing space. This prevents flow of the molten metal generation upon welding to the housing space. A vehicle using the battery and a method for manufacturing such a battery are also provided.

17 Claims, 22 Drawing Sheets

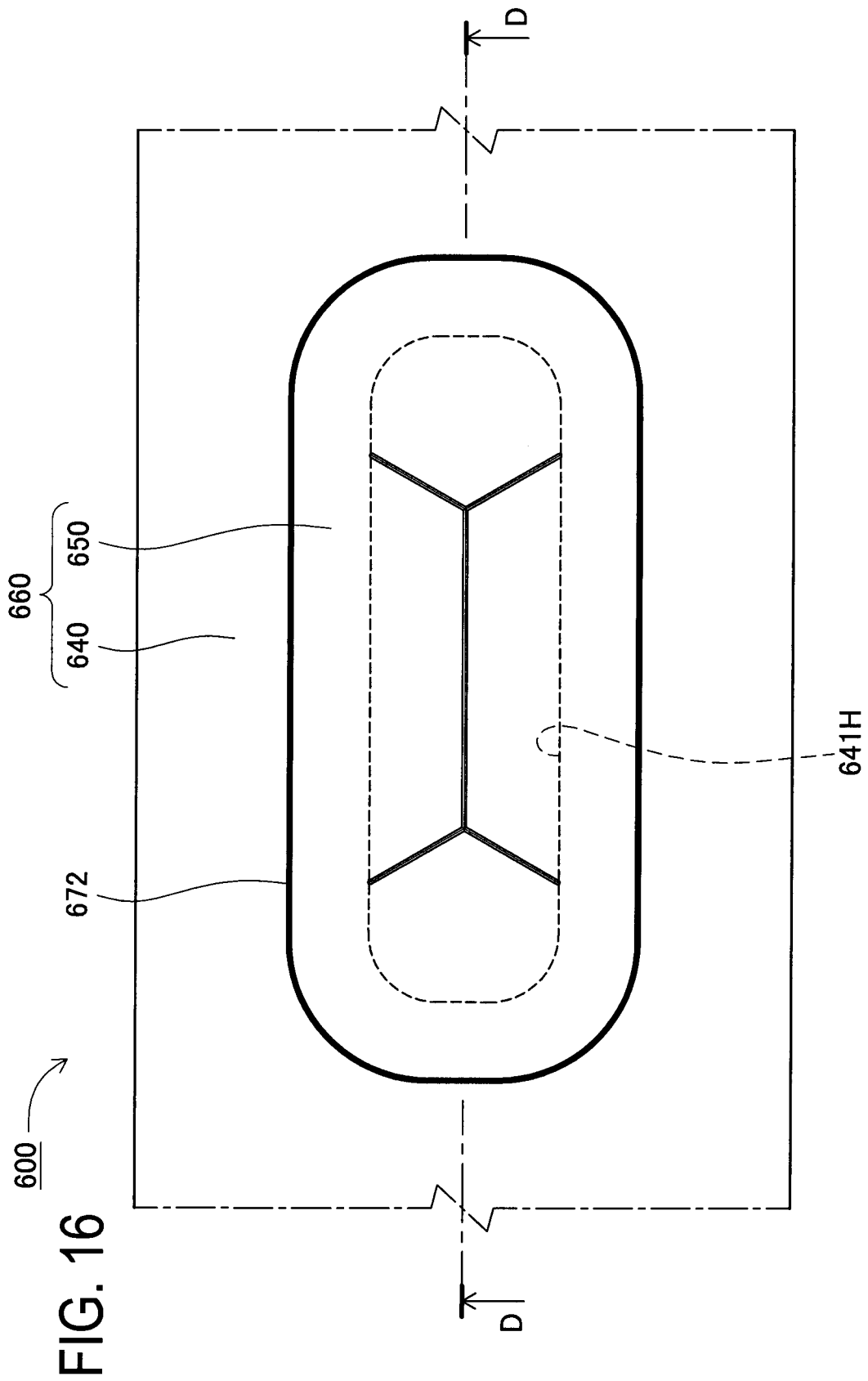

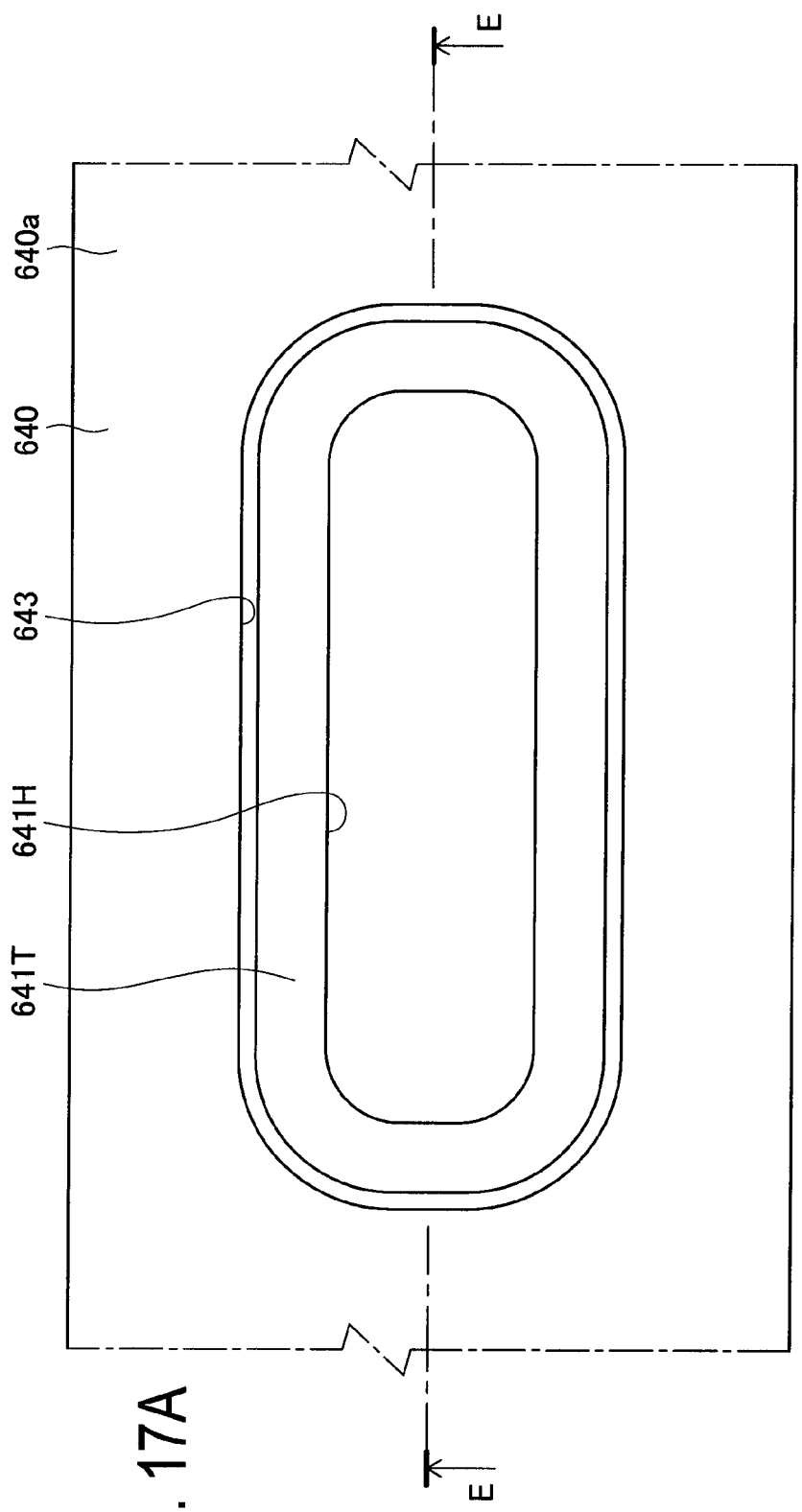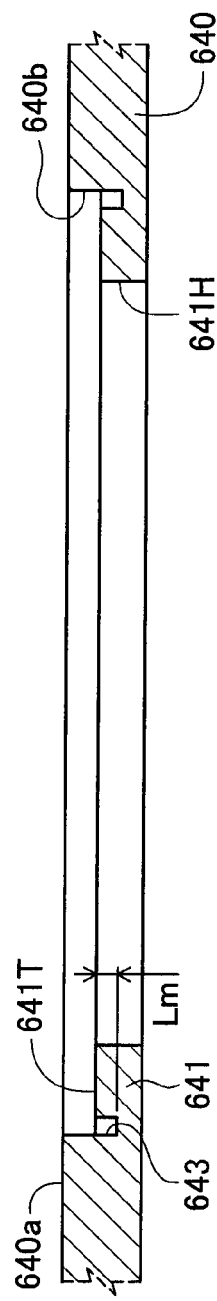

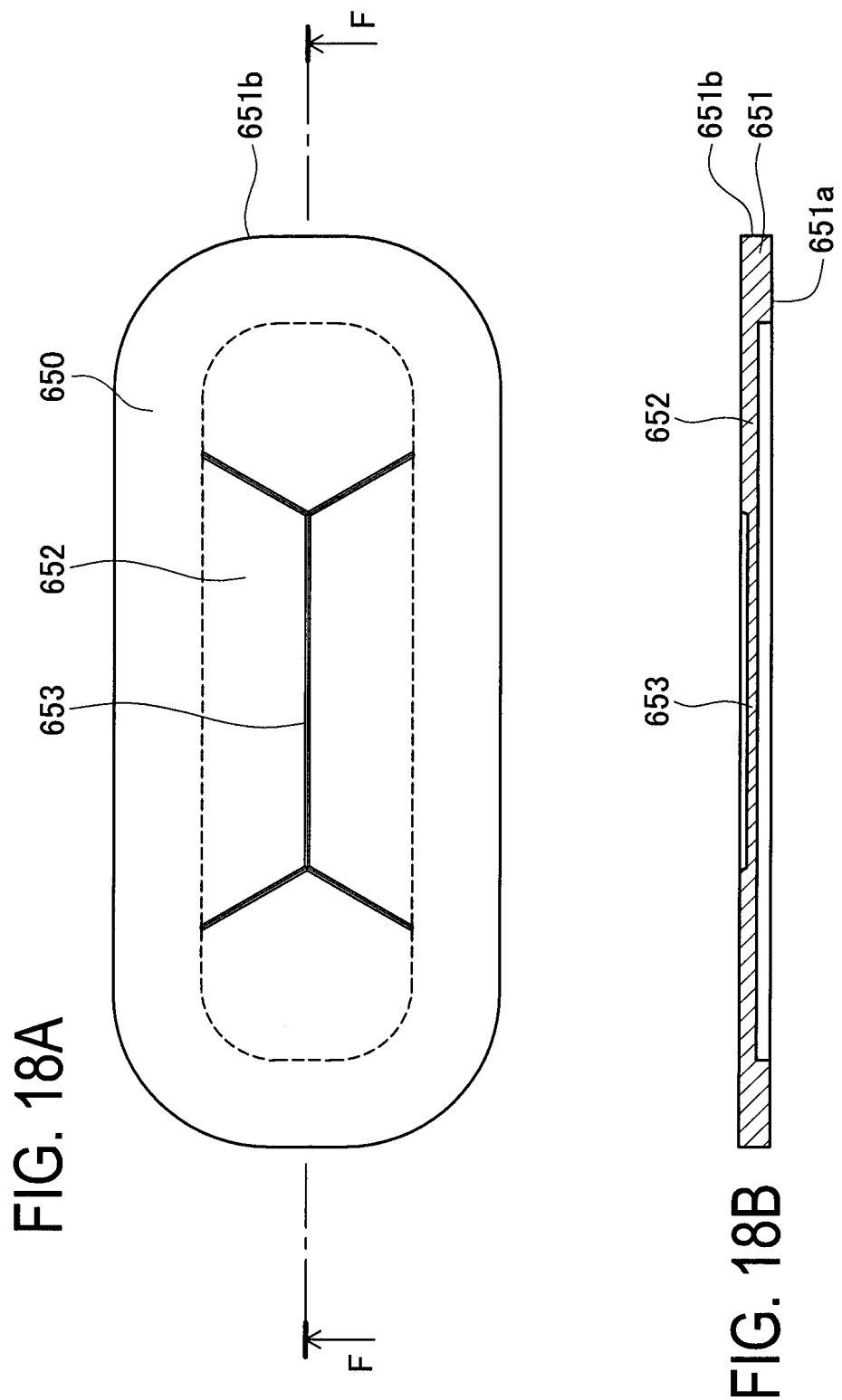

BATTERY, VEHICLE USING THE BATTERY, AND BATTERY MANUFACTURING METHOD

CROSS-REFERENCE TO RELATED APPLICATIONS

This application is a national phase application of International Application No. PCT/JP2007/074779, filed Dec. 18, 2007, and claims the priority of Japanese Application No. 2006-350060, filed Dec. 26, 2006, the contents of both of which are incorporated herein by reference.

TECHNICAL FIELD

The present invention relates to a battery, a vehicle using the battery, and a battery manufacturing method.

BACKGROUND ART

In recent years, various batteries have been proposed as a power source of a portable device, a cellular phone, etc. or a power source of an electric vehicle, a hybrid electric vehicle, etc. Some of those batteries include a power generation element, a case body member housing it, and a closing member closing an opening of the case body member, in which the case body member and the closing member are welded to each other (for example, see Patent Literature 1).

Citation List

Patent Literature 1: JP2002-184365A

A sealed battery (a battery) disclosed in Patent Literature 1 includes a group of electrodes (a power generation element), a bottom-closed tube-shaped battery case (a case body member) that houses it therein (a housing space), and a closing plate (a closing member) fitted in an opening (a housing opening) end of this battery case to close this opening. In this sealed battery in a state where the battery case and the closing plate are not welded yet, a part of an inner peripheral surface of the battery case and a part of an outer peripheral surface of the closing plate are tapered to form a circumferential welding groove between the fitted closing plate and the battery case so that the groove has a V-shaped cross section recessed from outside to inside of the sealed battery in a direction of thickness of the closing plate. The battery case and the closing plate are laser-welded by irradiating a laser beam to a groove bottom portion of the welding groove over the entire circumference thereof. Accordingly, the battery case and the closing plate are sealed at a welded portion formed in the welding groove.

SUMMARY OF THE INVENTION

Technical Problem

However, in the battery arranged such that the case body member and the closing member are welded from outside over the entire circumference thereof to close the opening of the case body member by the closing member, a part of molten metal generated by welding may flow from the welded portion of the case body member and closing member toward an inner portion of the case body member according to welding conditions. Furthermore, in the case where this molten metal reaches the housing space of the battery case, the molten metal may drop in the form of metal particles or grains into the housing space, leading to a short circuit between a positive electrode and a negative electrode in the power generation element and deterioration in battery characteristics. Thus, there is a demand for preventing the molten metal generated by welding from flowing into the housing space of the battery case.

The present invention has been made in view of the above circumstances and has an object to provide a battery including a first member having a housing opening for a housing space housing a power generation element and a second member which closes the opening of this first member, in which the first and second members are welded to each other through a welded portion formed in the first and second members so that molten metal generated during welding is prevented from flowing into the housing space, and a method of manufacturing the battery, and a vehicle using the battery.

Solution to Problem

A solution of the above problem is a battery comprising: a power generation element; and a case member having a housing space for housing the power generation element therein; wherein the case member includes: a first member forming an opening of the housing space; and a second member which closes the opening of the first member, the first and second members are welded to each other at a welded portion formed in the first and second members, and at least one of the first and second members is formed with a metal receiving area in an inter-member path between the first and second members to extend from the welded portion to the housing space, the metal receiving area being configured to receive a part of molten metal generated during welding.

In the battery of the invention, at least one of the first and second members is formed with the metal receiving area in the inter-member path extending from the welded portion to the housing space between the first and second members to receive a part of molten metal of the first and second members during welding.

In this battery, the metal receiving area is formed in this inter-member path. Accordingly, even when a part of molten metal flows in the inter-member path from the welded portion toward the housing space during welding, the metal receiving area can receive and store the part of the molten metal flowing therein.

It is therefore possible to restrain the molten metal from flowing into the housing space, thereby preventing the part of the molten metal from entering in the form of metal grains or particles into the housing space. Thus, the battery can prevent a short circuit between the positive electrode and the negative electrode in the power generation element and deterioration in battery characteristics resulting from the molten metal flowing in the housing space.

The metal receiving area may include for example a recess or a groove formed to be recessed in the first or second member and to face the inter-member path and also a space formed as a larger clearance between the first and second members than other portions so as to receive the molten metal.

This metal receiving area may be formed circumferentially along the opening of the first member or intermittently in a part of the circumferential welded portion in a circumferential direction. In this case, the position of the metal receiving area in the circumferential direction has to be determined in consideration of the amount of molten metal and the tendency of molten metal to flow according to the shape of the opening and changes or variations in welding conditions according to the position.

In the battery of the present invention, the molten metal does not need to be fully filled in the metal receiving area and may be received in the part of the metal receiving area.

Furthermore, in the battery of the present invention, the molten metal does not always need to be received in the metal receiving area. Specifically, it is conceivable that the tendency of molten metal to flow will change according to changes in welding conditions, size variations of the first and second members, changes in a contact or fitting state between them, and others. Accordingly, in the case where several conditions appear at the same time, the molten metal is caused to flow or a flow volume or a flowing distance increases. The invention includes a battery including the metal receiving area formed in preparation for such case. In other words, there are included batteries such as a battery having the metal receiving area but the molten metal did not flow from the welded portion, a battery in which the molten metal flowed from the welded portion but did not reach the metal receiving area, and others, even though in some batteries the molten metal is not always received or accumulated in the metal receiving area. Other batteries are also included if only the metal receiving area is formed, in which the molten metal is received in this metal receiving area and further the molten metal exists beyond the metal receiving area toward the housing space.

Furthermore, in the above battery, preferably, the metal receiving area is formed to be recessed in at least one of the first and second members.

In the battery of the present invention, the metal receiving area is formed to be recessed in at least one of the first member and the second member. In the battery of the invention, therefore, the first and second members can be welded by a similar welding work to a conventional case where the metal receiving area is not provided, while the flowing of the molten metal into the housing space can be prevented.

In one of the aforementioned batteries, preferably, the first and second members are provided with a small clearance portion in the inter-member path on the side from the metal receiving area to the housing space, the small clearance portion being smaller than a clearance at the metal receiving area between the first and second members.

In the battery of the invention, the small clearance portion is provided between the first and second members on the housing space side relative to the metal receiving area. Even when a part of molten metal reaches the metal receiving area during welding, the small clearance portion prevents the molten metal from further flowing toward the housing space side. Thus, the battery in which the molten metal was prevented from reaching the housing space can be provided.

Preferably, the clearance between the first and second members is provided to change stepwise between the metal receiving area and the small clearance portion. Such remarkable change in clearance size makes it more difficult for the molten metal to enter the small clearance portion.

In one of the aforementioned batteries, preferably, the opening of the housing space is a housing opening forming a path for insertion of the power generation element in the housing space, the first member is a case body member having a bottom-closed tube shape and including side parts that define the housing opening, and the second member is a closing member which closes the housing opening of the case body member, the closing member having a circumferential contact portion which contacts the side parts of the case body member.

In the battery of the invention, the case body member and the closing member are welded to each other at the welded portion so that the side parts forming the housing opening of the case body member are in contact with the contact portion of the closing member. At least one of the contact portion and the side parts is formed with the metal receiving area in the inter-member path from the welded portion to the housing space to thereby receive a part of molten metal generated during welding.

In this battery, even when a part of molten metal flows from the welded portion toward the housing space during welding of the case body member and the closing member, the metal receiving area formed in the inter-member path receives the part of the molten metal flowing thereto over the welded portion. Thus, the battery can be provided so that the molten metal resulting from welding of the case body member and the closing member was prevented from flowing to the housing space.

Alternatively, in the battery set forth in one of claims 1 to 3, preferably, the second member is a safety valve member, the first member is a valve holding member for holding the safety valve member, and the opening of the housing space is a valve hole through which the housing space is communicated with the safety valve member.

In the battery of the invention, the valve holding member and the safety valve member are welded to each other at the welded portion. At least one of the valve holding member and the safety valve member is formed with the metal receiving area in the inter-member path extending from the welded portion to the housing space to thereby receive a part of molten metal generated during welding.

In this battery, accordingly, even when a part of molten metal flows from the welded portion toward the housing space during welding of the valve holding member and the safety valve member, the metal receiving area formed in the inter-member path could receive the part of the molten metal. Thus, the battery can be provided in which the molten metal was prevented from flowing into the housing space.

Another aspect is a vehicle mounting the battery set forth in one of the above claims.

The vehicle of the invention mounts therein the battery formed with the metal receiving area to receive a part of molten metal generated during welding of the first and second members.

Accordingly, the battery can have high reliability, with reduced possibilities of a short circuit between the positive electrode and the negative electrode in the power generation element and deterioration of battery characteristics. Thus, the vehicle capable of excellently running can be provided.

It is to be noted that the vehicle which mounts the battery may includes, an electric vehicle, a hybrid electric vehicle, a motorbike or motorcycle, a forklift, electric scooter, a railroad vehicle, etc.

Another aspect is a method of manufacturing a battery comprising: a power generation element; and a case member having a housing space for housing the power generation element therein; wherein the case member includes: a first member forming an opening of the housing space; and a second member which closes the opening of the first member, the first and second members are welded to each other at a welded portion formed in the first and second members, at least one of the first and second members is formed with a metal receiving area in an inter-member path between the first and second members to extend from the welded portion to the housing space, the metal receiving area being configured to receive a part of molten metal generated during welding, and the method comprises a welding process for melting the welding target portion to weld the first and second members.

According to the battery manufacturing method of the invention, when the second member is placed to close the opening of the first member, the metal receiving area is formed in the inter-member path. In the welding process, thereafter, the welding target portion is melted to weld the first member and the second member.

At that time, the molten metal may flow toward the housing space according to the welding conditions and other states such as the size of the first and second members. Even in this case, however, the metal receiving area formed in the inter-member path can receive a part of the molten metal. This makes it possible to prevent the molten metal from flowing over the metal receiving area into the housing space.

Alternatively, this makes it possible to reduce the amount of part of the molten metal even when flows over the metal receiving area toward the housing space. It is therefore possible to prevent the molten metal from reaching the housing space or prevent a part of the molten metal reaching the housing space from dropping off in the form of metal particles or grains.

In the aforementioned battery manufacturing method, preferably, the metal receiving area is formed to be recessed in at least one of the first and second members.

In the battery manufacturing method of the invention, even though the metal receiving area is formed, the first and second members can be welded in the welding process in a similar manner to the case where no metal receiving area is provided.

In one of the aforementioned battery manufacturing methods, preferably, the first and second members are provided with a small clearance portion in the inter-member path on the side from the metal receiving area to the housing space, the small clearance portion being smaller than a clearance at the metal receiving area between the first and second members.

In the battery manufacturing method of the invention, the small clearance portion is formed on the housing space side relative to the metal receiving area. Even when a part of molten metal generated during welding reaches the metal receiving area, this molten metal is prevented from flowing toward the housing space through the small clearance portion.

In one of the aforementioned battery manufacturing methods, preferably, the opening of the housing space is a housing opening forming a path for insertion of the power generation element in the housing space, the first member is a case body member having a bottom-closed tube shape and including side parts that define the housing opening, and the second member is a closing member which closes the housing opening of the case body member, the closing member having a circumferential contact portion which contacts the side parts of the case body member.

According to the battery manufacturing method of the invention, when the side parts of the case member and the contact portion of the closing member are placed into contact with each other, the metal receiving area for receiving a part of molten metal generated during welding is formed in the inter-member path between the case member and the closing member to extend from the welding target portion to the housing space. In the subsequent welding process, when the welding target portion is melted to weld the case body member and the closing member, the metal receiving area formed in the inter-member path can receive the part of the molten metal even when flowing toward the housing space. Thus, it is possible to prevent the molten metal from flowing into the housing space.

In the aforementioned battery manufacturing method set forth in one of claims 7 to 9, preferably, the second member is a safety valve member, the first member is a valve holding member for holding the safety valve member, and the opening of the housing space is a valve hole through which the housing space is communicated with the safety valve member.

According to the battery manufacturing method of the invention, when the safety valve member is placed to close the valve hole of the valve holding member, the metal receiving area for receiving a part of molten metal generated during welding is formed in the inter-member path between the valve holding member and the safety valve member to extend from the welding target portion to the housing space. In the subsequent welding process, when the welding target portion is melted to weld the valve holding member and the safety valve member, the metal receiving area formed in the path can receive a part of molten metal even when flowing toward the housing space. Thus, it is possible to prevent the molten metal from flowing in the housing space.

BRIEF DESCRIPTION OF DRAWINGS

FIG. 16 is a partial enlarged plan view of a main part of the battery of Embodiment 2;

FIG. 17A is a partial enlarged plan view of a main part of the closing member of the battery of Embodiment 2;

FIG. 17B is a cross sectional view taken along a line E-E in FIG. 17A;

FIG. 18A is a plan view of a safety valve member of the battery of Embodiment 2;

FIG. 18B is a cross sectional view taken along a line F-F in FIG. 18A;

DESCRIPTION OF EMBODIMENTS

A detailed description of Embodiments 1 to 3 and Modified embodiments 1 to 5 of the present invention will now be given referring to the accompanying drawings.

Embodiment 1

Figure 1:
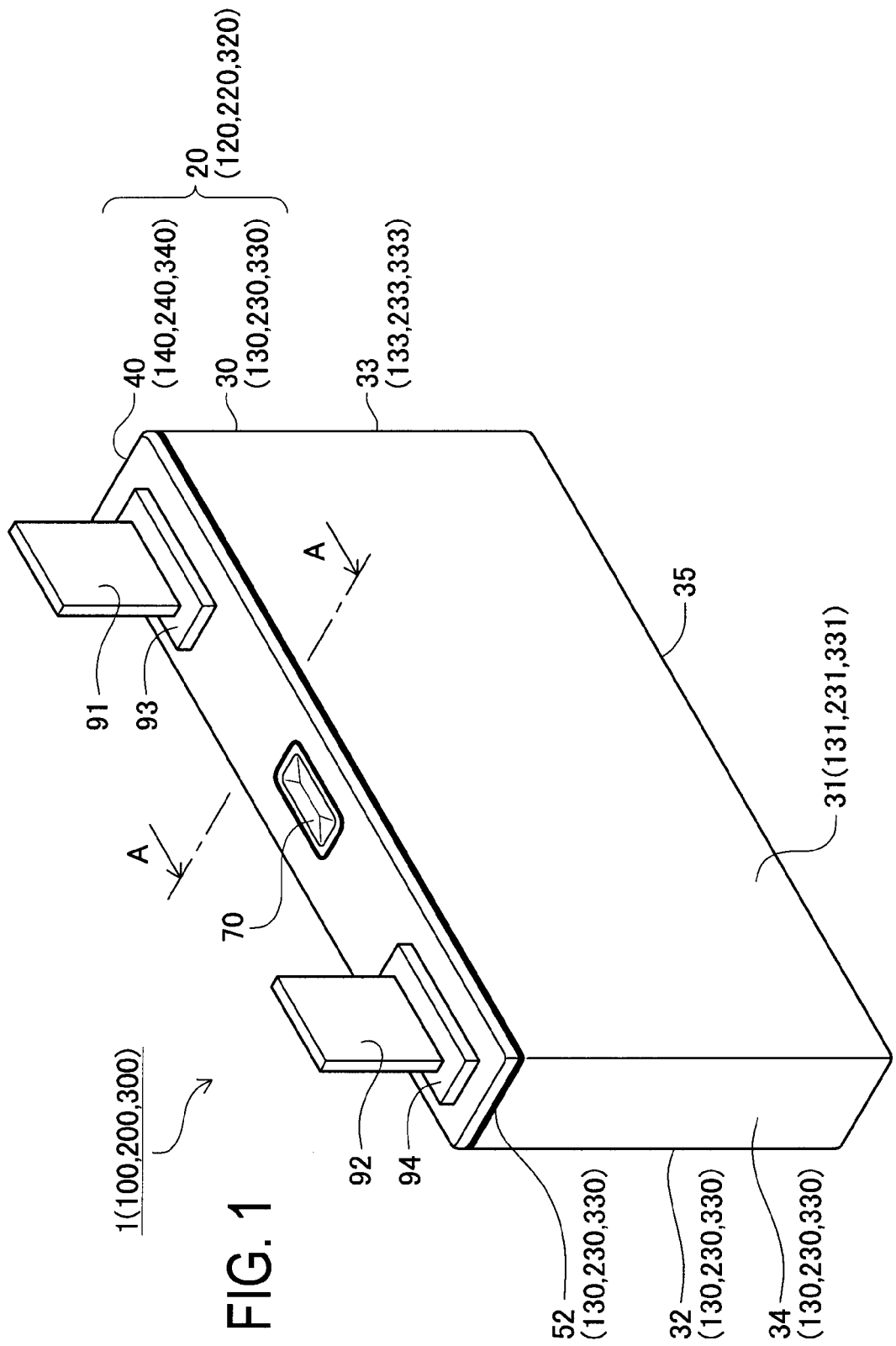
FIG. 1 is a perspective view of a battery of Embodiment 1 and Modified embodiments 1 to 3.
Figure 2:
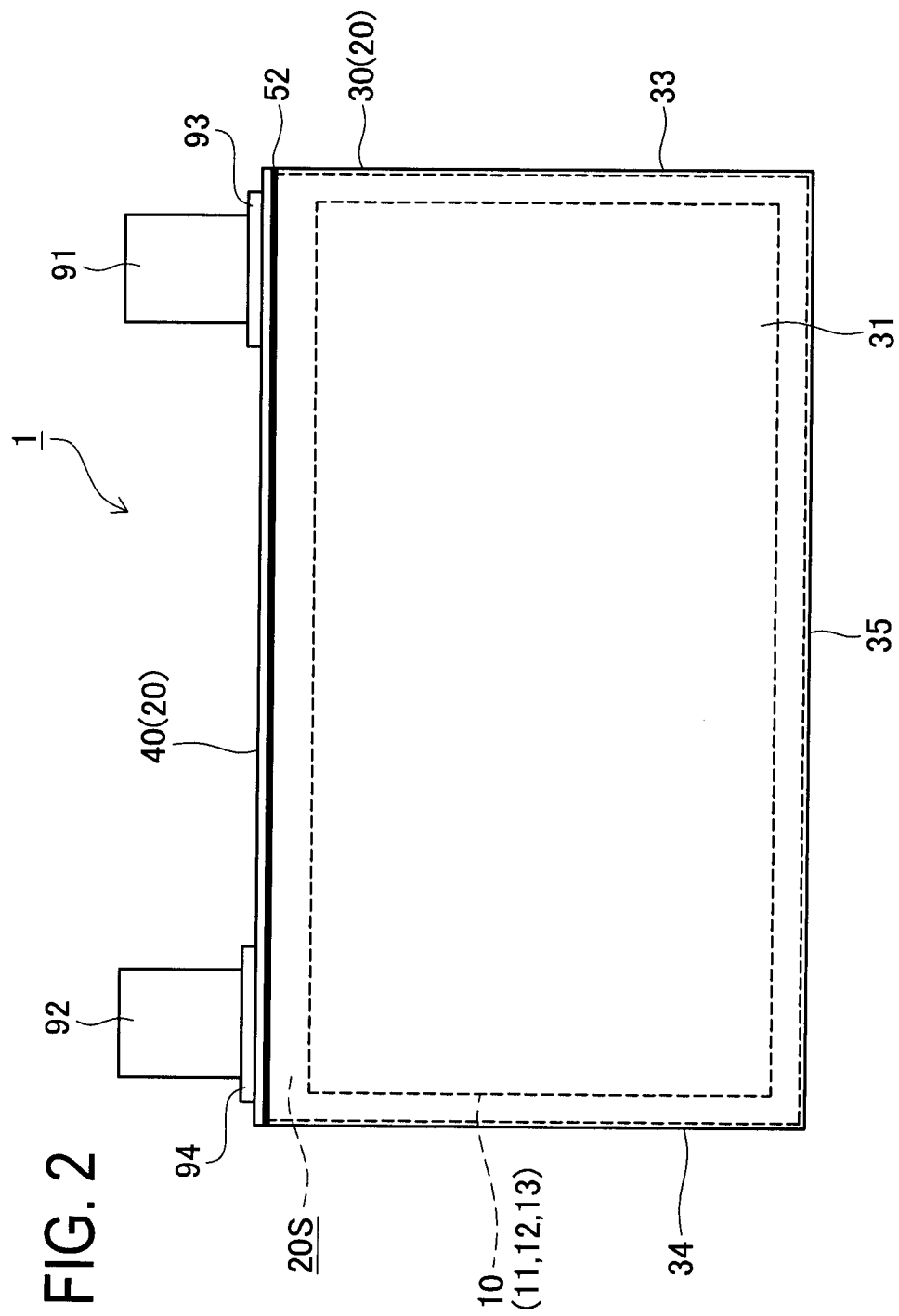
FIG. 2 is a front view of the battery of Embodiment 1 and Modified embodiments 1 to 3.
Figure 3:
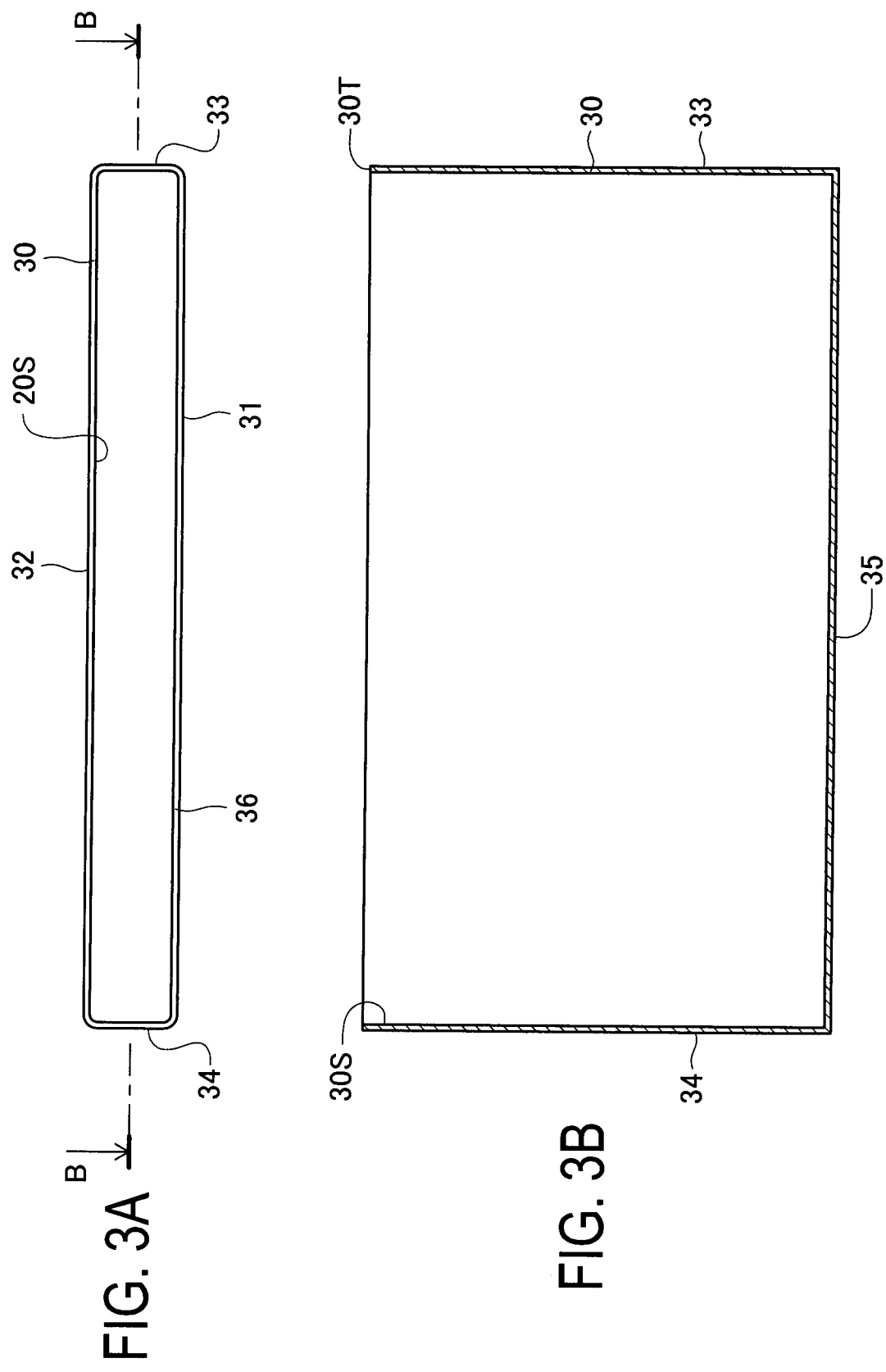
FIG. 3A is a plan view of a case body member of the battery of Embodiment 1.
FIG. 3B is a cross sectional view taken along a line B-B in FIG. 3A.
Figure 4:
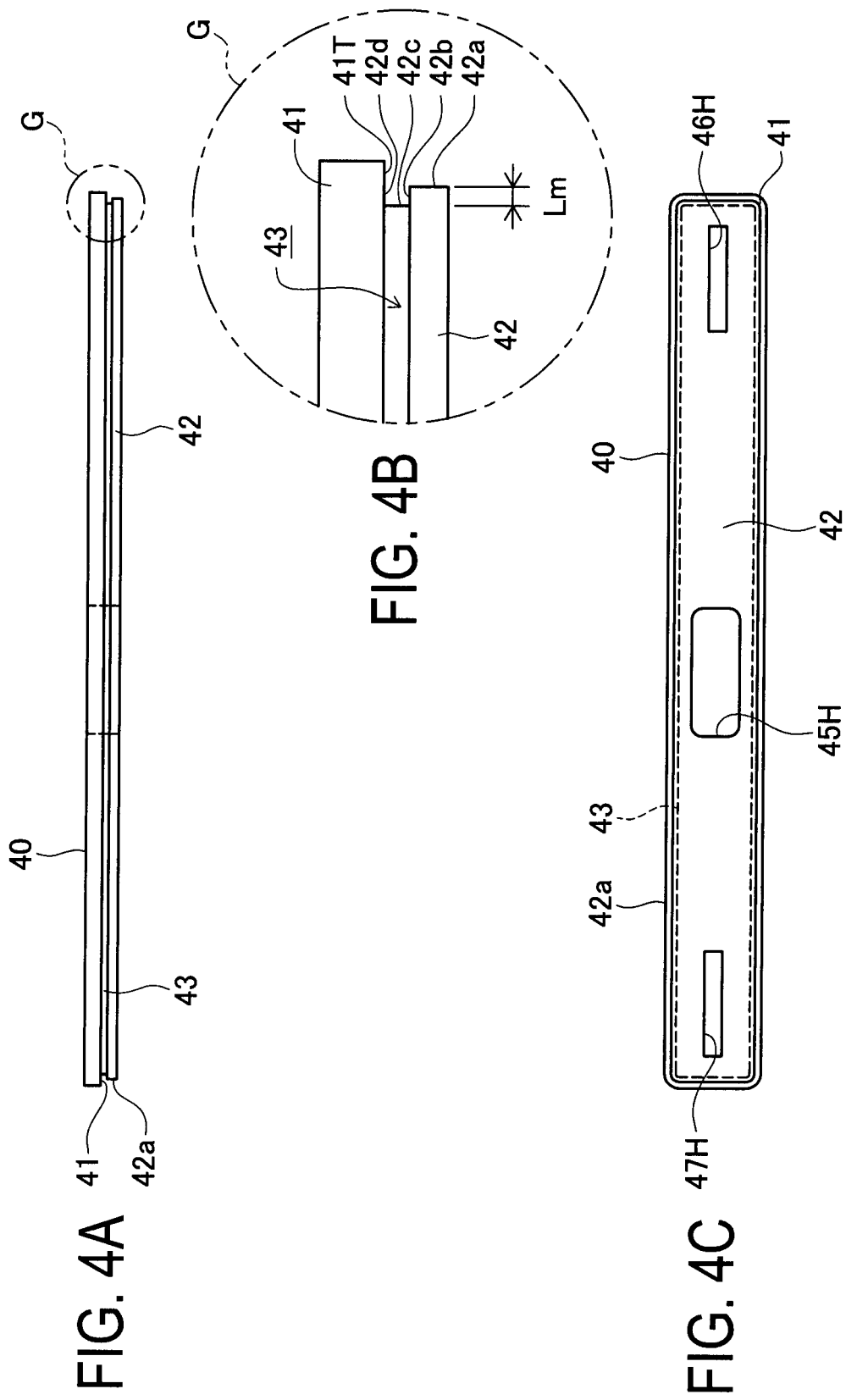
FIG. 4A is a side view of a closing member of the battery of Embodiment 1.
FIG. 4B is an enlarged view of an area G in FIG. 4A.
FIG. 4C is a bottom view viewed from the side of a case inner portion.

A battery 1 of Embodiment 1 is a lithium ion secondary battery to be used as a power source for an electric vehicle and a hybrid electric vehicle. This battery 1 is a rectangular cell having a substantially rectangular parallelepiped shape as shown in FIGS. 1 and 2. This battery 1 is constituted of a power generation element 10 and a case member 20 having a housing space 20S in which the power generation element 10 is housed or contained. This case member 20 further includes a case body member 30 having a substantially rectangular parallelepiped outer shape (see FIGS. 3A and 3B) and a housing opening 30S, and a plate-like closing member 40 having a rectangular outer shape and closing the housing opening 30S of the case body member 30 (see FIGS. 4A to 4C; FIG. 4B is an enlarged view of an area G in FIG. 4A). The case body member 30 and the closing member 40 are fixed by laser welding at a welded portion 52 extending along their entire circumferences (see FIG. 1).

Of the case member 20, the case body member 30 shown in FIGS. 3A and 3B is made of aluminum and integrally formed in a bottom-closed tube shape by deep-drawing a material so that an insertion side (an upper side in FIG. 3B) is formed as the housing opening 30S of the housing space 20S. This housing opening 30S of the case body member 30 serves as a path along which the power generation element 10 will be inserted in the housing space 20S.

This case body member 30 has a rectangular bottom part 35 and four, first, second, third, and fourth side parts 31, 32, 33, and 34 (hereinafter, also referred to as "first side part 31 et al.") each extending from four sides of the bottom part 35 in a direction perpendicular to the bottom part 35. The first and second side parts 31 and 32 are largest side parts as shown in FIGS. 3A and 3B and equal in shape and arranged in parallel with each other. The third and fourth side parts 33 and 34 are arranged individually between the first and second side parts 31 and 32 and in parallel with each other.

On the other hand, the closing member 40 shown in FIGS. 4A to 4C is a rectangular plate-like member made of aluminum and formed to protrude in a thickness direction by press working. This closing member 40 includes an annular contact portion 41 having a contact surface 41T which will contact with an opening end face 30T of the case body member 30 over the entire circumference thereof when the closing member 40 is put to close the housing opening 30S of the case body member 30. This closing member 40 also has an inner portion 42 located inside than the contact portion 41 in an extending direction (in a direction parallel with a drawing sheet of FIG. 4C) of the closing member 40. The inner portion 42 protrudes from the same level as the contact surface 41T in a direction away from the contact portion 41 (downward in FIG. 4A) in the thickness direction of the closing member 40 (in a vertical direction in FIG. 4A). This inner portion 42 is placed in the housing space 20S.

This inner portion 42 is formed with a recessed groove 43 having a rectangular cross section recessed inward from a peripheral surface 42a of the inner portion 42 in the extending direction. This recessed groove 43 is a groove recessed at a depth Lm to have side surfaces 42b and 42d and a bottom surface 42c. As mentioned later, this groove 43 serves as a metal receiving area for receiving a part of molten metal generated during welding of the case body member 30 and the closing member 40.

This closing member 40 has a positive terminal insertion hole 46H and a negative terminal insertion hole 47H for respectively inserting an external positive terminal 91 and an external negative terminal 92 mentioned later as shown in FIG. 4C. In addition, a valve mounting hole 45H is provided therebetween. This valve mounting hole 45H is closed by a plate-like safety valve member 70 as shown in FIG. 1.

In Embodiment 1, the case body member 30 corresponds to a first member and the closing member 40 corresponds to a second member of the invention.

Of the battery 1, the power generation element 10 is constituted of, for example, a positive electrode, a negative electrode, a separator, an electrolyte, and others, and is housed in the housing space 20S of the case body member 30 as shown in FIG. 2. This positive electrode (not shown) of the power generation element 10 is connected to the external positive terminal 91 in the housing space 20S of the case body member 30. On the other hand, the negative electrode (not shown) of the power generation element 10 is connected to the external negative terminal 92 in the housing space 20S of the case body member 30. The electrolyte (not shown) is also poured in the housing space 20S of the case body member 30.

The external positive terminal 91 connected to the positive electrode of the power generation element 10 is made of aluminum. This external positive terminal 91 protrudes outside through the insertion hole 46H of the closing member 40 while the terminal 91 is sealed liquid-tightly and electrically insulated from the closing member 40 by a seal member 93 molded in the insertion hole 46H (see FIG. 1) of the closing member 40.

On the other hand, the external negative terminal 92 connected to the negative electrode of the power generation element 10 is made of copper. This terminal 92 protrudes outside through the insertion hole 47H of the closing member 40 while the terminal 92 is sealed liquid-tightly and electrically insulated from the closing member 40 by a seal member 94 molded in the insertion hole 47H (see FIG. 1) of the closing member 40.

In the battery 1 of Embodiment 1, the closing member 40 closes the case body member 30 housing the power generation element 10 in the housing space 20S. The closing member 40 is also gas-tightly fixed to the case body member 30 while the inner portion 42 is placed in the housing space 20S of the case body member 30, that is, inside the first side part 31 et al. Specifically, while the contact surface 41T of the contact portion 41 of the closing member 40 is placed in contact with the opening end face 30T of the first side part 31 et al. of the case body member 30, the case body member 30 and the closing member 40 are welded to each other by laser from outside over the entire circumference along the end face 30T and the contact surface 41T. Thus, the welded portion 52 is formed between the case body member 30 and the closing member 40 (see FIG. 1).

Furthermore, concrete explanation is given.

In this battery 1, when the opening end face 30T of the first side part 31 et al. of the case body member 30 and the contact surface 41T of the contact portion 41 of the closing member 40 are brought into contact to close the housing opening 30S, a welding target portion (i.e., a to-be-welded portion) 51 is formed between the case body member 30 and the closing member 40, thereby forming a path PQR between the first and second members ("inter-member path").

In this Embodiment 1, this inter-member path PQR is a passage extending from a first point P located near a leading end (a right end in FIG. 5) of the welding target portion 51 on the opening end face 30T and the contact surface 41T, passing an opening edge Q at which the opening end face 30T of the first side part 31 et al. intersects with a first inner surface 31I (a second inner surface 32I, a third inner surface 33I, and a fourth inner surface 34I, which are hereinafter referred to as "first inner surface 31I et al."), to a second point R on the first inner surface 31I et al. to face the housing space 20S of the case body member 30 at the same position as lower edge of the peripheral surface 42a of the closing member 40 in the thickness direction (in the vertical direction in FIG. 5) of the closing member 40.

Figure 5:
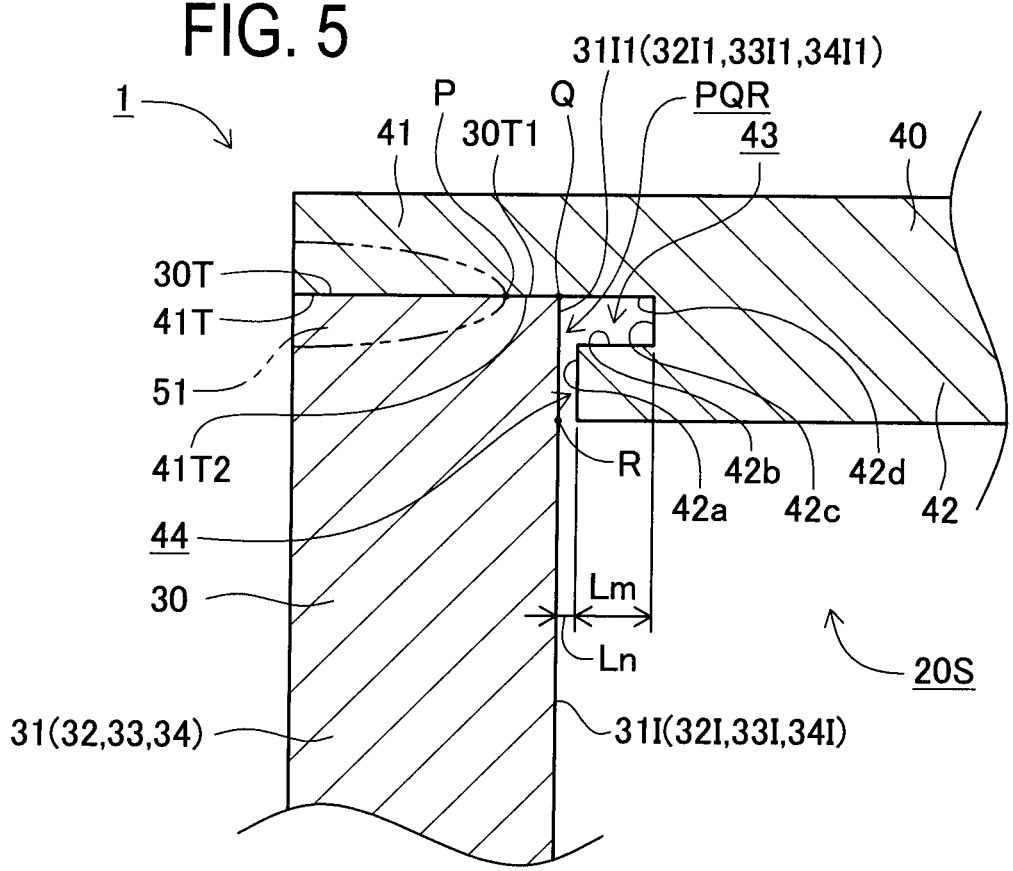
FIG. 5 is an explanatory view to show a state of the battery of Embodiment 1 in which the case body member and the closing member are not welded yet, corresponding to a view taken along a line A-A in FIG. 1.

As easily understood from FIG. 5, the groove 43 having the side surfaces 42b and 42d and the bottom surface 42c is recessed in the inner portion 42 of the closing member 40 to open in the inter-member path PQR.

Furthermore, in the inter-member path PQR on the side from the groove 43 to the housing space 20S (the second point R), a slight clearance portion 44 is formed with a clearance distance Ln between the first inner surface 31I et al. of the first side part 31 et al. and the peripheral surface 42a of the inner portion 42. This clearance distance Ln of the slight clearance portion 44 between the case body member 30 and the closing member 40 is smaller by the depth Lm of the groove 43 than the clearance distance (Lm+Ln) between the case body member 30 and the closing member 40 at the groove 43.

Subsequently, the welding target portion 51 indicated by a broken line in FIG. 5 is irradiated with a laser beam to form the welded portion 52. Thus, a part of molten metal may move toward the housing space 20S through the inter-member path PQR. This motion is different according to the laser welding conditions, the size of each portion in the inter-member path PQR, and others. In other words, there may be a case where molten metal hardly moves through the inter-member path PQR and also a case where a large amount of molten metal moves through the inter-member path PQR.

Figure 6:
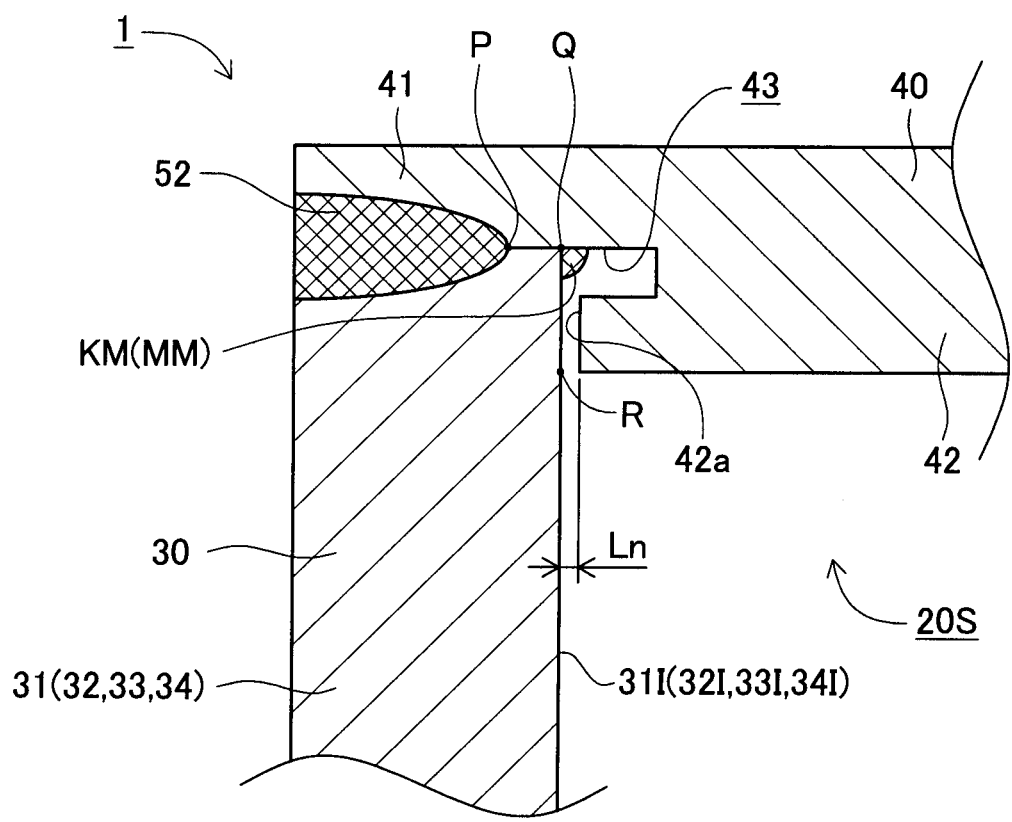
FIG. 6 is an explanatory view to show a state of the battery of Embodiment 1 after the case body member and the closing member are welded, corresponding to a view taken along the line A-A in FIG. 1.

FIG. 6 shows a case where a small part of molten metal MM generated during welding of the case body member 30 and the closing member 40 goes from the first point P to the groove 43 beyond the opening edge Q in the inter-member path PQR. The partial molten metal MM reaching the groove 43 is solidified into solid metal KM.

Figure 7:
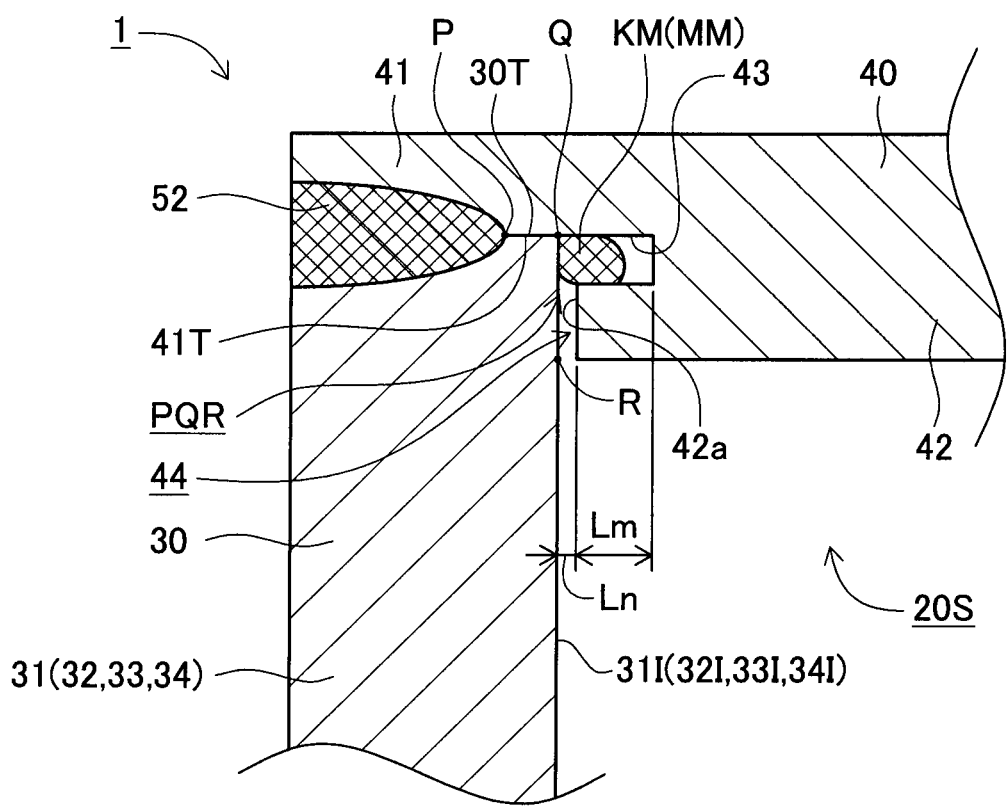
FIG. 7 is another explanatory view to show a state of the battery of Embodiment 1 after the case body member and the closing member are welded, showing that an amount of molten metal is larger than in FIG. 6.

On the other hand, FIG. 7 shows a case where a larger amount of molten metal MM than in FIG. 6 flows from the welded portion 52. In this case, the molten metal MM goes into the groove 43 and is solidified into the solid metal KM in this groove 43. In this case, if the groove 43 is not formed, a part of the molten metal MM could reach the housing space 20S beyond the second point R. In this battery 1 having the groove 43, on the other hand, the solid metal KM is received in the groove 43 and did not reach the housing space 20S.

In the battery 1, as mentioned above, the clearance distance Ln of the slight clearance portion 44 is designed to be smaller than the clearance distance (Lm+Ln) of the inter-member path PQR at the groove 43. This configuration does not allow the molten metal MM to easily move from the groove 43 toward the housing space 20S (the second point R) through the small clearance portion 44, but allows the molten metal MM to stay in the groove 43. This makes it possible to prevent the molten metal MM from further moving toward the housing space 20S. In the battery 1 of Embodiment 1, especially, the small clearance portion 44 has the clearance distance Ln smaller stepwise than the clearance distance (Lm+Ln) at the groove 43. This makes it difficult for the molten metal MM to enter the small clearance portion 44.

Figure 8:
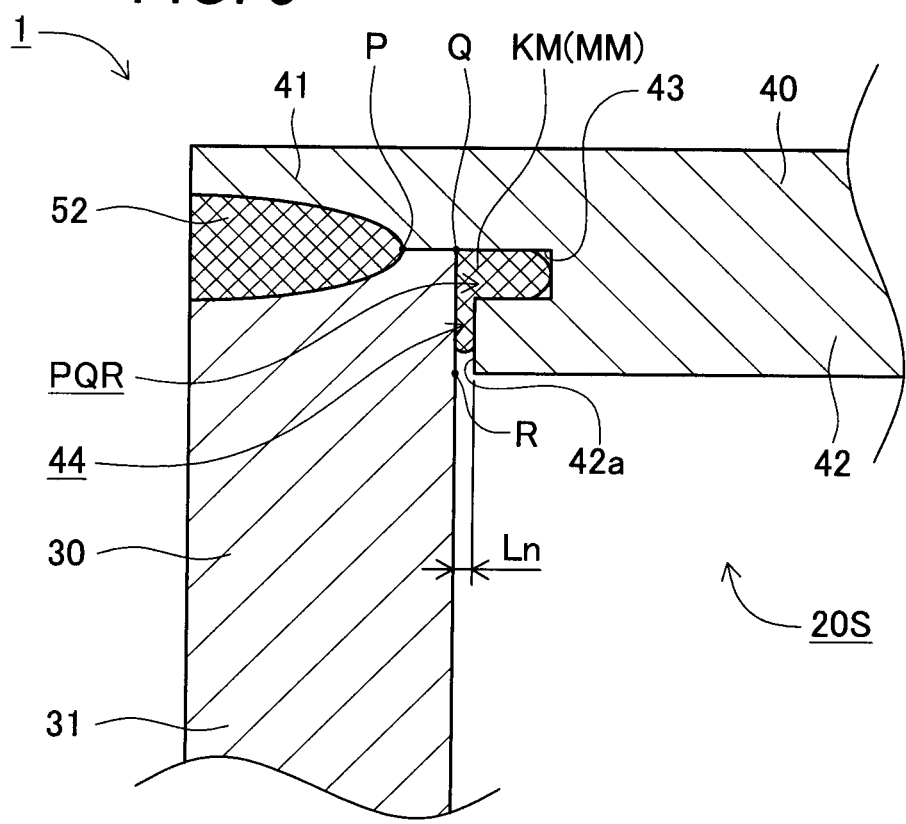
FIG. 8 is another explanatory view to show a state of the battery of Embodiment 1 after the case body member and the closing member are welded, showing that an amount of molten metal is larger than in FIGS. 6 and 7.

FIG. 8 shows a case where a larger amount of molten metal MM further flows from the welded portion 52. In this case, most part of the groove 43 is filled with the molten metal MM (the solid metal KM). In the battery 1 of Embodiment 1, even when a large amount of molten metal MM flows, a part of the molten metal MM is received in the groove 43 formed in the inter-member path PQR. Accordingly, the amount of molten metal MM that flows over the groove 43 toward the housing space 20S can be restrained. It is therefore possible to prevent the molten metal MM from flowing in the housing space 20S and dropping down as metal particles or grains.

In the battery 1 of Embodiment 1, as above, the inter-member path PQR includes the circumferential groove 43 formed in the inner portion 42 of the closing member 40.

As shown in FIGS. 6 to 8, accordingly, even when a part of molten metal MM flows from the welded portion 52 toward the housing space 20S during welding of the case body member 30 and the closing member 40, the groove 43 formed in the inter-member path PQR can receive the part of the molten metal MM flowing in this groove 43. Consequently, the battery 1 can be provided in which the molten metal MM is restrained from flowing in the housing space 20S.

Since the molten metal MM is restrained from flowing toward the housing space 20S, it is possible to prevent a part of this molten metal MM from entering in the form of metal particles or grains into the housing space 20S. This makes it possible to reduce a short circuit between the positive electrode and the negative electrode in the power generation element 10 and deterioration in other battery characteristics.

In the battery 1 of Embodiment 1, the groove 43 is formed as a recess in the peripheral surface 42a of the inner portion 42 of the closing member 40 apart from the welding target portion 51.

In this battery 1, accordingly, the case body member 30 and the closing member 40 can be welded by a similar welding work to a conventional case where the groove 43 is not provided, while the flowing of the molten metal MM into the housing space 20S can be prevented as above.

In the battery 1 of Embodiment 1, furthermore, the small clearance portion 44 having the clearance distance Ln is provided on the housing space 20S side relative to the groove 43. Even when the molten metal MM reaches the groove 43, it is possible to prevent the molten metal MM from flowing toward the housing space 20S through the small clearance portion 44. Thus, the battery 1 can be provided in which the molten metal MM was restrained from reaching the housing space 20S.

In Embodiment 1, as mentioned above, the clearance between the case body member 30 and the closing member 40 is changed stepwise from the clearance distance (Lm+Ln) to the clearance distance Ln by the groove 43 and the small clearance portion 44. This makes it difficult for the molten metal MM to enter from the groove 43 into the small clearance portion 44.

A method of manufacturing the battery 1 will be explained below with reference to FIGS. 1 to 5.

As to this battery 1, processes excepting a welding process the details of which will be mentioned later may be conducted using a well known technique and herein are omitted or simply explained. The following explanation is focused on the process.

In advance, the case body member 30 (see FIGS. 3A and 3B) and the closing member 40 (see FIGS. 4A to 4C) formed with the groove 43 in the peripheral surface 42a of the inner portion 42 are prepared.

In a separate step, the external positive terminal 91 and the external negative terminal 92 are connected to the positive electrode (not shown) and the negative electrode (not shown) of the power generation element 10, respectively.

Then, the external positive terminal 91 is inserted in the insertion hole 46H of the closing member 40 and the external negative terminal 92 is inserted in the insertion hole 47H of the closing member 40 respectively. The seal member 93 gas-tightly seals between the external positive terminal 91 and the insertion hole 46H and the seal member 94 gas-tightly seals between the external negative terminal 92 and the insertion hole 47H.

Successively, the power generation element 10 and the inner portion 42 of the closing member 40 are inserted in the housing space 20S of the case body member 30, and the contact portion 41 is placed in contact with the opening end face 30T of the first side part 31 et al. of the case body member 30. Thus, the inner portion 42 is placed inside the first side part 31 et al. of the case body member 30.

Next, a welding process is explained.

In the welding process, as shown in FIG. 5, while the contact surface 41T of the contact portion 41 is placed in contact with the opening end face 30T of the first side part 31 et al., a laser beam is irradiated from outside in the thickness direction (from a left side in FIG. 5) of the first side part 31 et al. of the case body member 30 to the boundary (the opening end face 30T) between the contact portion 41 and the first side part 31 et al., i.e., to the welding target portion 51. This laser beam is moved with respect to the case body member 30 and the closing member 40 in a circumferential direction thereof. Consequently, the case body member 30 and the closing member 40 are welded at the welded portion 52. Thus, the closing member 40 can close the housing opening 30S of the housing space 20S of the case body member 30.

Meanwhile, according to the welding conditions, the sizes of the case body member 30 and the closing member 40, and other states, there is a case where the molten metal MM generated during welding flows from the welded portion 52 toward the housing space 20S through the inter-member path PQR formed between the case body member 30 and the closing member 40.

Even in this case, in Embodiment 1 including the groove 43 in the inter-member path PQR, this groove 43 can receive a part of the molten metal MM even if flowing toward the housing space 20S (see FIGS. 5 and 6). This makes it possible to prevent the molten metal MM from flowing over the groove 43 toward the housing space 20S.

Even when a part of molten metal MM flows over the groove 43 toward the housing space 20S, the amount thereof can be reduced. This can reduce the possibilities that the molten metal MM reaches the housing space 20S, the molten metal MM stays in the housing space 20S, and the part of the molten metal MM comes into a movable state, for example, metal particles or grains tending to drop down into the housing space 20S.

In the method of manufacturing the battery 1 of Embodiment 1, the groove 43 is provided but placed apart from the welding target welding portion 51 (the welded portion 52). Accordingly, it is advantageous to weld the case body member 30 and the closing member 40 in the welding process by a similar welding work to a conventional case where the groove 43 is not formed.

Since the small clearance portion 44 is provided on the housing space 20S side relative to the groove 43, even when a part of molten metal MM generated during welding reaches the groove 43 in the present manufacturing method of the battery 1, it is possible to restrain this molten metal from further flowing toward the housing space 20S through the small clearance portion 44.

Subsequently, a predetermined amount of electrolyte is poured in the housing space 20S of the case body member 30 and then the safety valve member 75 is fixed to the valve mounting hole 45H of the closing member 40.

As above, the battery 1 shown in FIG. 1 is completed.

Modified embodiments 1 to 3 are explained below with reference to FIGS. 9 to 11B.

Batteries 100, 200, and 300 of Modified embodiments 1 to 3 are different from the battery 1 of Embodiment 1 mentioned above in part of a configuration of a case member (a case body member and a closing member) used therein and a position of the metal receiving area but similar in the welding position of the case body member and the closing member and other parts or components. Accordingly, the following explanation will be focused on the differences from Embodiment 1.

Modified Embodiment 1

Figure 9:
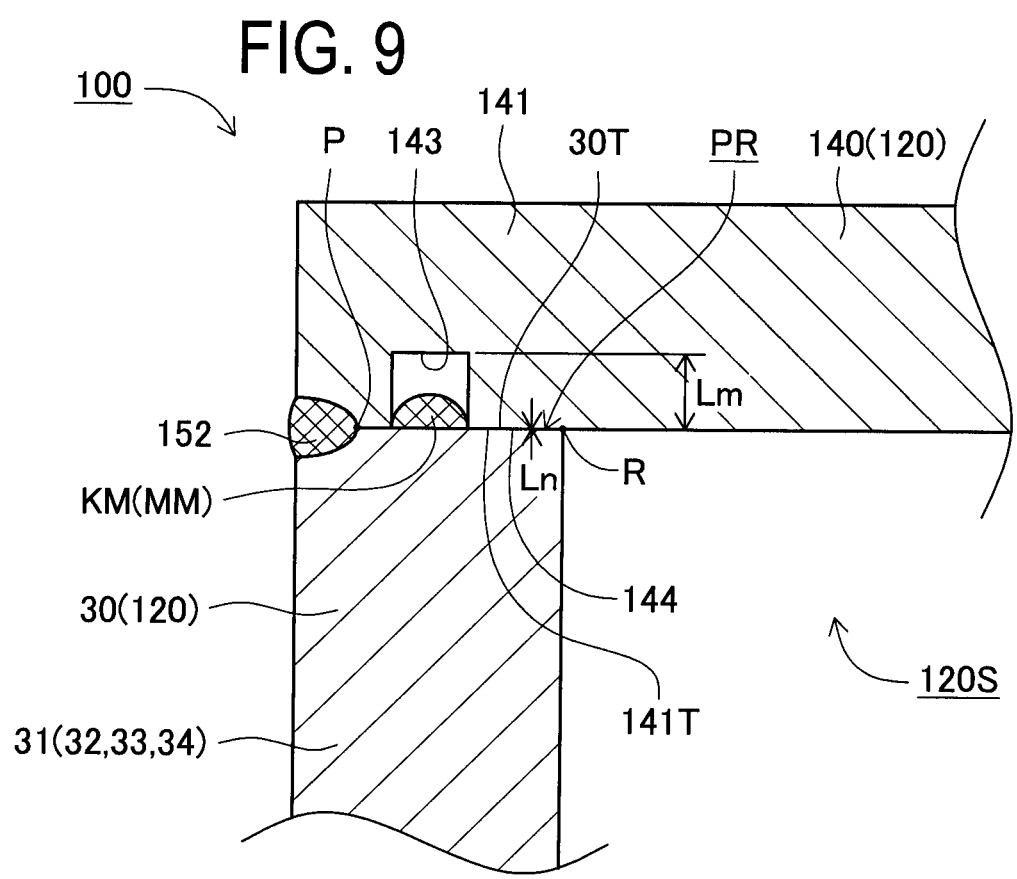
FIG. 9 is an explanatory view to show a state of a battery of Modified embodiment 1 after a case member and closing member are welded, corresponding to a cross sectional view taken along the line A-A in FIG. 1.

A case member 120 of the battery 100 of Modified embodiment 1 is constituted of the case body member 30 identical to that of Embodiment 1 and a closing member 140 having a rectangular flat plate shape, as shown in FIG. 9. This closing member 140 includes a contact portion 141 circumferentially provided along a peripheral edge. This contact portion 141 is configured to include a metal receiving area 143 circumferentially formed in a contact surface 141T contacting with the case body member 30 in a thickness direction (in a vertical direction in FIG. 9). This metal receiving area 143 is a groove recessed at a depth Lm (a distance in the vertical direction in FIG. 9).

The case body member 30 and the closing member 140 are welded by laser to each other over the entire circumference while the contact portion 141 of the closing member 140 is placed in contact with the opening end face 30T of the first side part 31 et al. of the case body member 30, thereby forming a welded portion 152.

In this Modified embodiment 1, an inter-member path PR is a path extending from a first point P located at a leading end of the welded portion 152 to a second point R facing a housing space 120S. The metal receiving area 143 is formed in this path PR.

In Modified embodiment 1 in which the metal receiving area 143 is formed, similarly, even when molten metal MM flows from the welded portion 152, the metal receiving area 143 can receive the molten metal MM (solid metal KM). This makes it possible to prevent the molten metal MM from reaching the housing space 120S.

In this Modified embodiment 1, the contact surface 141T of the contact portion 141 and the opening end face 30T of the case body member 30 contact with each other but are not in completely close contact relation, so that many fine small clearance portions 144 are generated. This fine clearance Ln is smaller than the depth Lm of the metal receiving area 143, thereby preventing the molten metal MM from flowing to the housing space 120S through the small clearance portions 144. Consequently, the battery 100 can be provided in which the molten metal MM was restrained from reaching the housing space 120S.

It is to be noted that the clearance between the case body member 30 and the closing member 140 is changed stepwise from the depth Lm of the metal receiving area 143 to the depth Ln of each small clearance portion 144. Such remarkable difference in the clearance distance can prevent the molten metal MM from entering from the metal receiving area 143 into each small clearance portion 144.

Modified Embodiment 2

Figure 10:
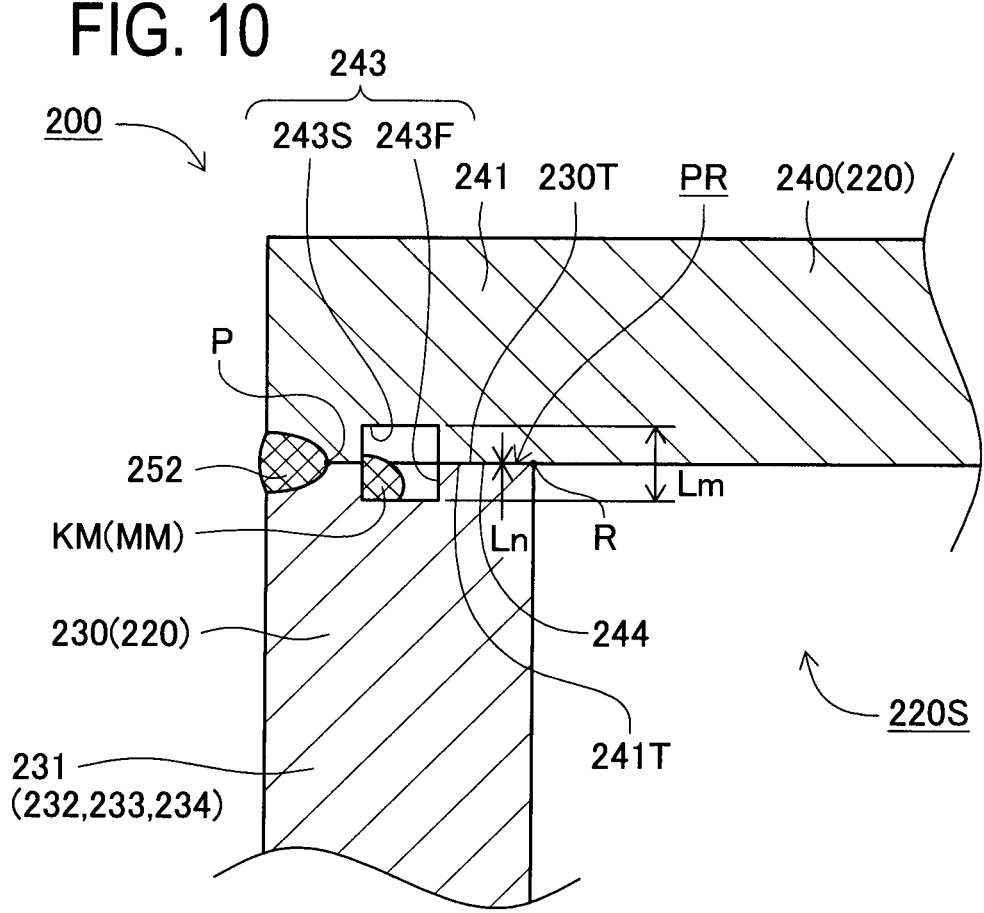
FIG. 10 is an explanatory view to show a state of a battery of Modified embodiment 2 after a case member and closing member are welded, corresponding to a cross sectional view taken along the line A-A in FIG. 1.

A case member 220 of a battery 220 of Modified embodiment 2 is constituted of a case body member 230 having a bottom-closed tube shape identical to the case body member 30 of Embodiment 1 and a closing member 240 having a rectangular flat plate shape, as shown in FIG. 10. This case body member 230 is configured such that a first circumferential groove 243F is recessed in an opening end face 230T of a first side part 231 to a fourth side part 234 at near the center in a thickness direction (a lateral direction in FIG. 10) of the case body member 230. On the other hand, the closing member 240 includes a contact portion 24I circumferentially provided along a periphery edge and is formed with a second circumferential groove 243S recessed in a thickness direction (in a vertical direction in FIG. 10) of the closing member 240 as with Modified embodiment 1. The first and second grooves 243F and 243F are formed in such places as to face each other.

The case body member 230 and the closing member 240 are welded by laser to each other over the entire circumference thereof while the contact surface 241T of the contact portion 241 is placed in contact with the opening end face 230T of the case body member 230, thereby forming a welded portion 252.

In this Modified embodiment 2, an inter-member path PR is a path extending from a first point P located at a leading end of the welded portion 252 to a second point R facing a housing space 220S. The first and second grooves 243F and 243S are formed in this inter-member path PR to define a metal receiving area 243 having a depth Lm (a distance in the vertical direction in FIG. 10).

In Modified embodiment 2 in which the metal receiving area 243 is formed, similarly, even when molten metal MM flows from the welded portion 252, the metal receiving area 243 can receive the molten metal MM (solid metal KM). This makes it possible to prevent the molten metal MM from reaching the housing space 220S.

In this Modified embodiment 2, the contact surface 241T of the contact portion 241 and the opening end face 230T of the case body member 230 contact with each other but are not in completely close contact relation, so that many fine small clearance portions 244 are generated. This fine clearance Ln is smaller than the depth Lm of the first and second grooves 243F and 243S, thereby preventing the molten metal MM from flowing to the housing space 220S through the small clearance portions 244.

It is to be noted that the clearance between the case body member 230 and the closing member 240 is changed stepwise from the depth Lm of the metal receiving area 243 to the depth Ln of each small clearance portion 244. Such remarkable difference in the clearance distance can prevent the molten metal MM from entering from the metal receiving area 243 into each small clearance portion 244.

Modified Embodiment 3

Figure 11A:
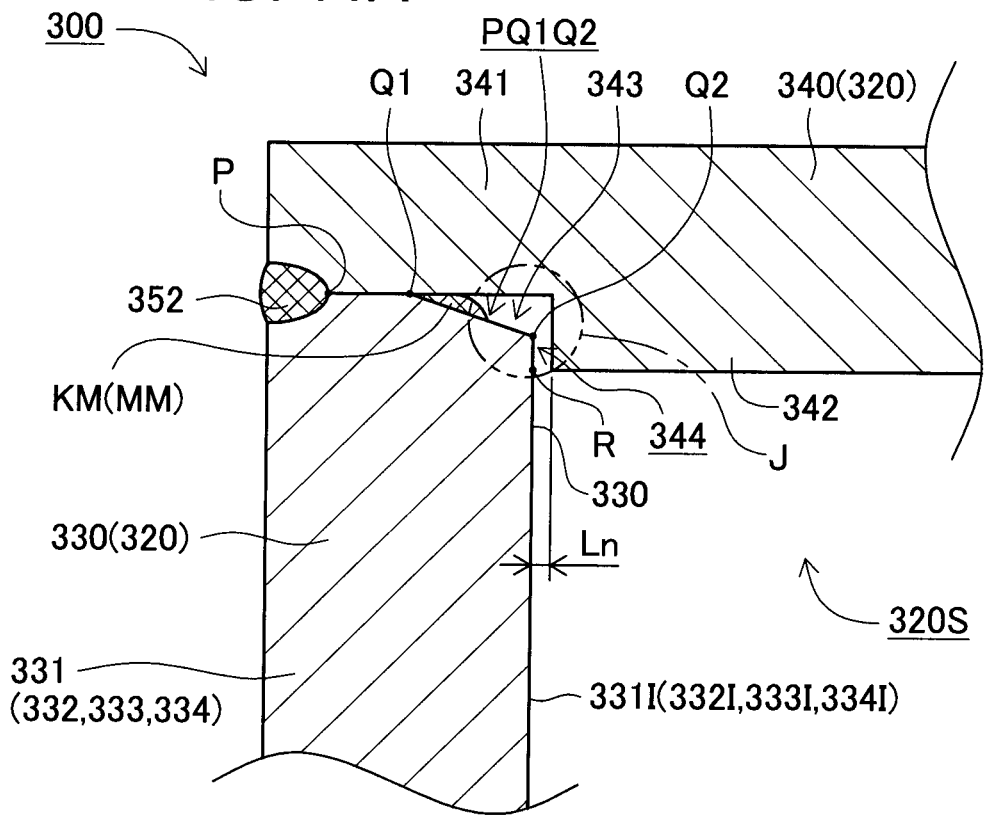
FIG. 11A is an explanatory view to show a state of a battery of Modified embodiment 3 after a case member and closing member are welded, corresponding to a cross sectional view taken along the line A-A in FIG. 1.
Figure 11B:
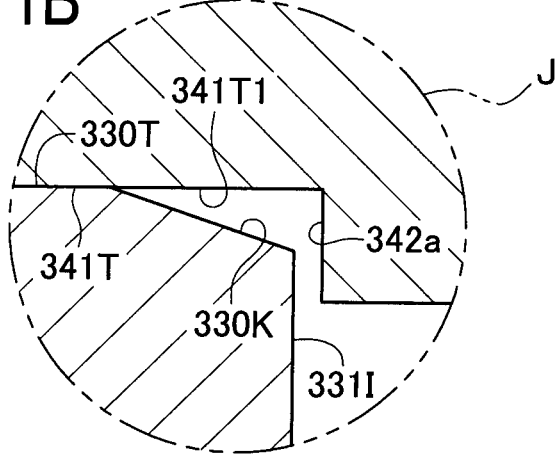
FIG. 11B is an enlarged view of an area J in FIG. 11A.

A case member 320 of a battery 300 of Modified embodiment 3 is constituted of a case body member 330 having a bottom-closed tube shape identical to the case body member 30 of Embodiment 1 and a closing member 340 having a rectangular flat plate shape, as shown in FIGS. 11A and 11B. FIG. 11B is an enlarged view of an area J in FIG. 11A.

In this case body member 330, each of inner side parts 331 to 334 includes a slant surface 330K joining an opening end face 330T and a first inner surface 331I (a second inner surface 332I, a third inner surface 333I, and a fourth inner surface 334I). Each slant surface 330K is formed by chamfering each corner between the opening end face 330T and the first side part 331I et al.

On the other hand, the closing member 340 has a contact portion 341 circumferentially provided including a contact surface 341T which contacts with the opening end face 330T of the case body member 330 over the entire circumference of the opening end face 330T when the closing member 340 closes the an housing opening 330S of the case body member 330 and also a contact-portion inner surface 341T1 continuous from the contact surface 341T in the same plane. This closing member 340 also has an inner portion 342 located inside (on a right side in FIG. 11A) than the contact portion 341 in an extending direction (the same as the extending direction of the closing member 40, see FIG. 4C) of the closing member 340. The inner portion 342 protrudes from the same level as the contact-portion inner surface 341T1 in a direction away from the contact portion 341 in a thickness direction of the closing member 340 (in a vertical direction in FIG. 11A). This inner portion 342 is placed in a housing space 320S.

The case body member 330 and the closing member 340 are welded to each other by laser over the entire circumference thereof while the opening end face 330T is placed in contact with the contact surface 341T, thereby forming a welded portion 352.

In this Modified embodiment 3, an inter-member path PQ1Q2R is a path extending from a first point P located at a leading end of the welded portion 352, passing a first corner Q1 between the opening end face 330T and the slant surface 330K and also a second corner Q2 between this slant surface 330K and the first inner surface 331I et al., to a second point R on the first inner surface 331I et al. to face the housing space 320S of the case body member 330 at the same position as a lower edge of a peripheral surface 342a of the closing member 340 in the thickness direction (in the vertical direction in FIG. 11A) of the closing member 340. In the inter-member path PQ1Q2R provided between the first and second corners Q1 and Q2, a widish internal space is defined by the slant surface 330K, the contact-portion inner surface 341T1, and a part of the peripheral surface 342a. This internal space serves as a metal receiving area 343.

Accordingly, in Modified embodiment 3, the metal receiving area 343 is formed in the inter-member path PQ1Q2R. Also in this Modified embodiment 3 in which the metal receiving area 343 is formed, even when molten metal MM flows from the welded portion 352, the 343 can receive the molten metal MM (solid metal KM), thereby preventing the molten metal MM from reaching the housing space 320S.

In Modified embodiment 3, the case body member needs only to have the slant surface 330K to form the metal receiving area 343. Accordingly, the case body member 330 and the closing member 340 can be made more easily.

In this battery 300, similarly, a small clearance portion 344 is formed between the case body member 330 and the closing member 340 on the housing space 320S side relative to the metal receiving area 343. Even when a part of molten metal MM generated during welding reaches the metal receiving area 343, the small clearance portion 344 prevents the molten metal MM from flowing to the housing space 320S therethrough. Thus, the battery 300 can be provided in which the molten metal MM was restrained from reaching the housing space 320S.

Figure 13:
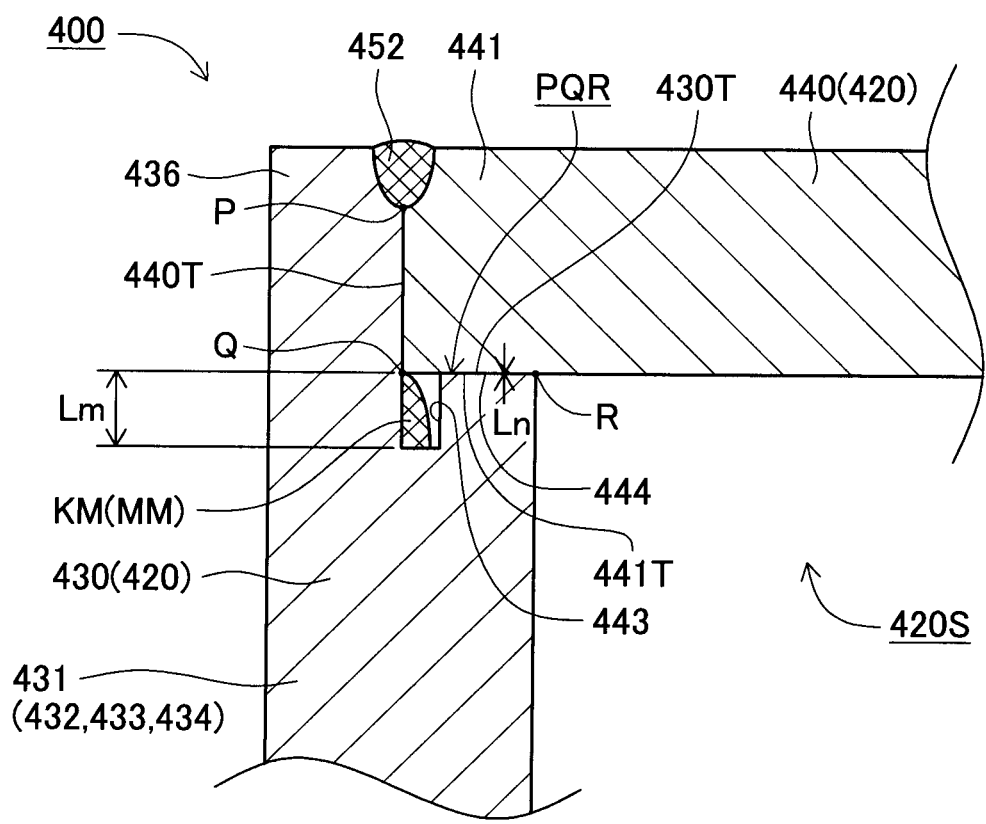
FIG. 13 is an explanatory view to show a state of a battery of Modified embodiment 4 after a case member and closing member are welded, corresponding to a cross sectional view taken along a line C-C in FIG. 12.
Figure 14:
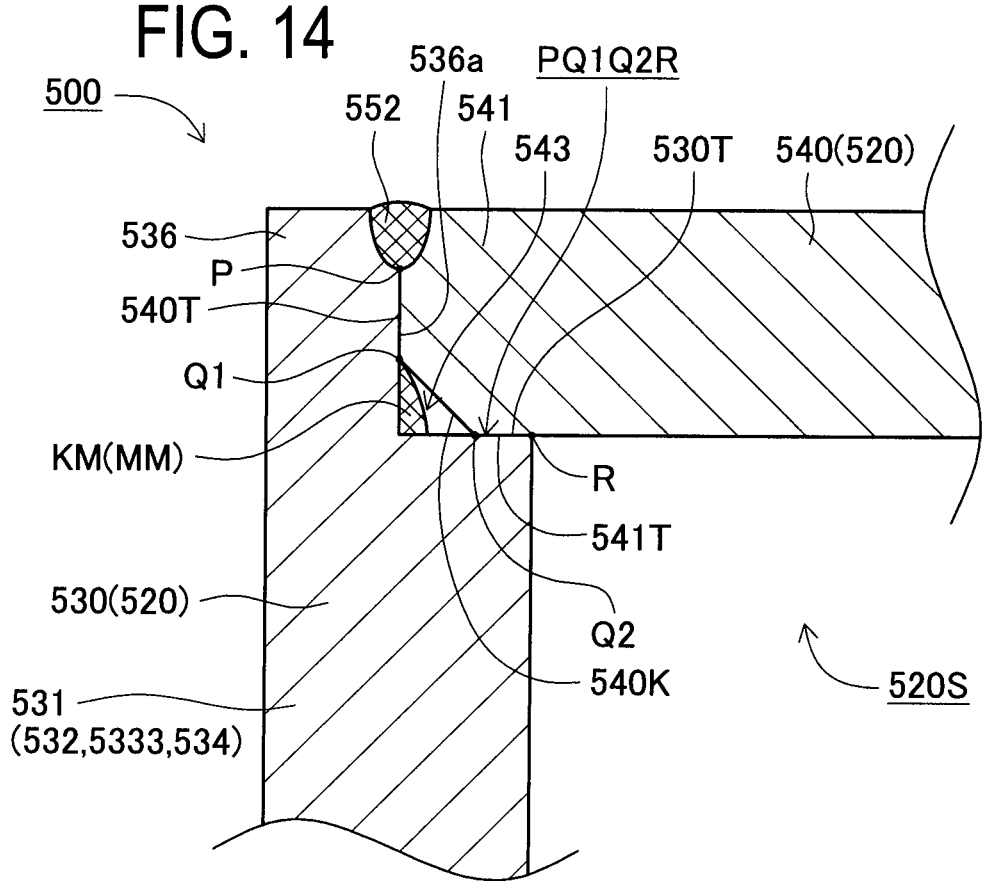
FIG. 14 is an explanatory view to show a state of a battery of Modified embodiment 5 after a case member and closing member are welded, corresponding to a cross sectional view taken along the line C-C in FIG. 12.

Next, Modified embodiments 4 and 5 are explained with reference to FIGS. 12 to 14.

Figure 12:
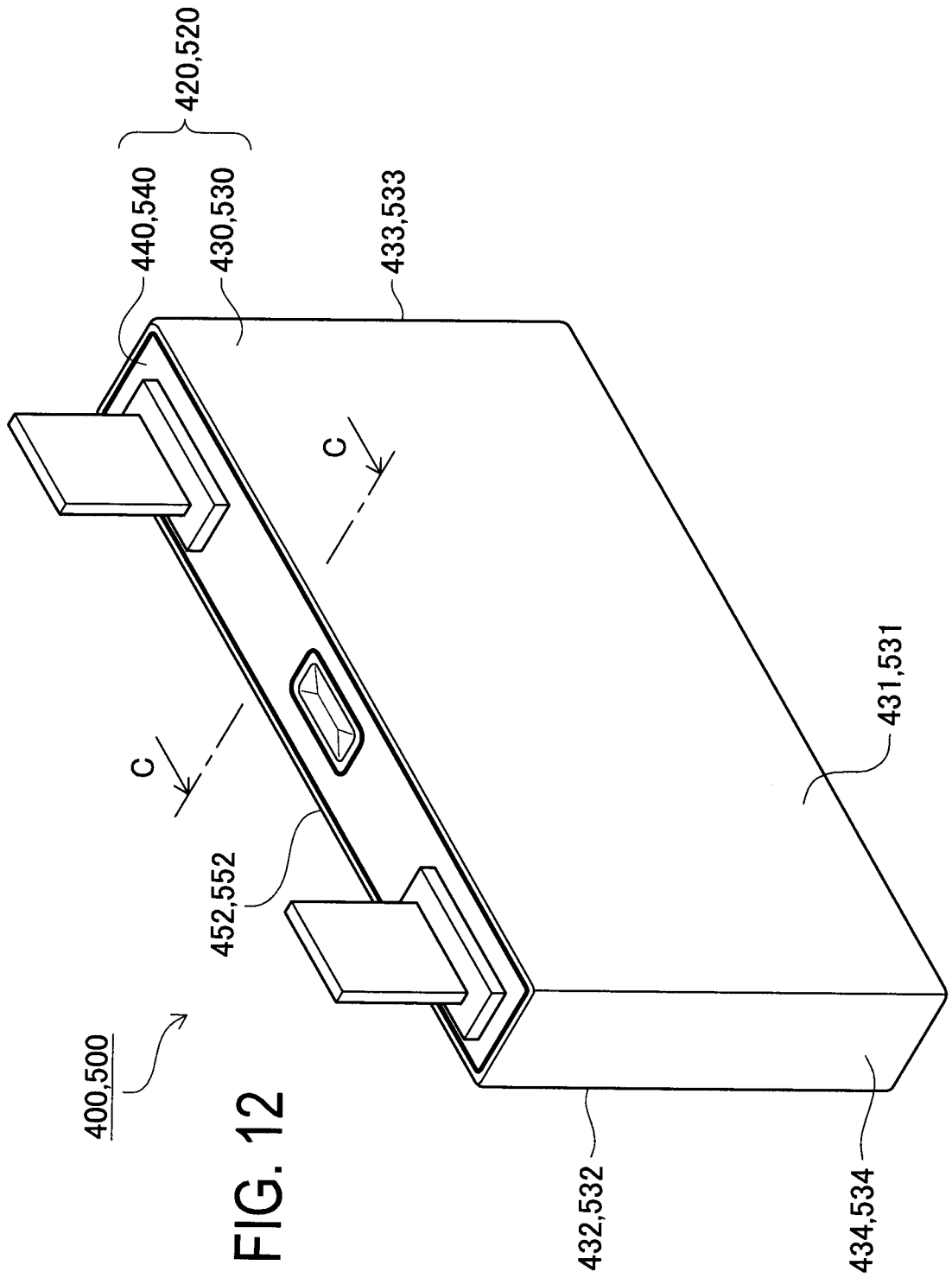
FIG. 12 is a perspective view of a battery of Modified embodiments 4 and 5.

As shown in FIG. 12, batteries 400 and 500 of Modified embodiments 4 and 5 are identical to the batteries 1, 100, and others of Embodiment 1 and Modified embodiments 1 to 3 mentioned above excepting part of the configuration of the case member (the case body member and the closing member) used therein, the position of the metal receiving area, and the welded position of the case body member and the closing member. Thus, the following explanation is focused on the differences from Embodiment 1 and Modified embodiments 1 to 3.

Modified Embodiment 4

A case member 420 of a battery 400 of Modified embodiment 4 is constituted of a case body member 430 having a bottom-closed rectangular parallelepiped outer shape and a closing member 440 having a rectangular flat plate shape as shown in FIG. 12. As shown in FIG. 13, the case body member 430 includes a circumferential opening end face 430T of a first side part 431 to a fourth side part 434 and a circumferential surrounding portion 436 protruding from this opening end face 430T and located on an outer circumferential side (a left side in FIG. 13). On the other hand, the closing member 440 has a contact portion 441 circumferentially provided to contact with the opening end face 430T. This closing member 440 is inserted in use in the surrounding portion 436 of the case body member 430. While the contact surface 441T of the contact portion 441 of the closing member 440 is placed in contact with the opening end face 430T of the case body member 430 and an outer peripheral surface 440T of the closing member 440 is surrounded by the surrounding portion 436, the case body member 430 and the closing member 440 are welded to each by laser over the entire circumference thereof, thereby forming a welded portion 452 therebetween.

An inter-member path PQR in this Modified embodiment 4 is a path extending from a first point P located at a leading end of the welded portion 452, passing a corner Q between the outer peripheral surface 440T and the contact surface 441T of the closing member 440, to a second point R on the contact surface 441T to face a housing space 420S. The metal receiving area 443 is a groove recessed at a depth Lm and circumferentially formed in the case body member 430 in the inter-member path PQR.

Even when molten metal MM flows from the welded portion 452, this metal receiving area 443 receives the molten metal MM (solid metal KM) to prevent the molten metal MM from reaching the housing space 420S.

In Modified embodiment 4, the contact surface 441T of the contact portion 441 and the opening end face 430T of the case body member 430 contact each other, but are not in completely close contact relation, so that many small clearance portions 444 are generated. Each small clearance portion 444 has a fine clearance Ln smaller than the depth Lm of the metal receiving area 443, thereby especially preventing the molten metal MM from flowing to the housing space 420S through each small clearance portion 444.

It is to be noted that the clearance between the case body member 430 and the closing member 440 is changed stepwise from the depth Lm of the metal receiving area 443 to the depth Ln of each small clearance portion 444. Such remarkable difference in the clearance distance can prevent the molten metal MM from entering from the metal receiving area 443 into each small clearance portion 444.

Modified Embodiment 5

A case member 520 of a battery 500 of Modified embodiment 5 is constituted of a case body member 530 having a bottom-closed rectangular parallelepiped outer shape and a closing member 540 having a rectangular flat plate shape as shown in FIG. 12. As shown in FIG. 14, this case body member 530 includes a circumferential opening end face 530T of a first side part 531 to a fourth side part 534 and a circumferential surrounding portion 536 protruding from this opening end face 530T and located on an outer circumferential side (a left side in FIG. 14), as with the case body member 430 of Modified embodiment 4.

On the other hand, the closing member 540 has a contact portion 541 circumferentially provided to contact with the opening end face 530T. This contact portion 541 has a contact surface 541T which contacts with the opening end face 530T and a slant surface 540K made by chamfering a corner between the contact surface 541T and an outer peripheral surface 540T. This closing member 540 is inserted in use in the surrounding portion 536 of the case body member 530.

While the contact surface 541T of the contact portion 541 of the closing member 540 is placed in contact with the opening end face 530T of the case body member 530 and the outer peripheral surface 540T of the closing member 540 is surrounded by the surrounding portion 536, the case body member 530 and the closing member 540 are welded to each other by laser over the entire circumference thereof, thereby forming a welded portion 552 therebetween.

An inter-member path PQ1Q2R in this Modified embodiment 5 is a path extending from a first point P located at a leading end of this welded portion 552, passing a first corner Q1 between the outer peripheral surface 540T and the slant surface 540K of the closing member 540 and further a second corner Q2 between this slant surface 540K and the contact surface 541T, going along the opening end face 530T, to a second point R to face a housing space 520S of the case body member 530. In this path PQ1Q2R, between the first and second corners Q1 and Q2, an internal space is defined by the opening end face 530T, the inner surface 536a of the surrounding portion 536, and the slant surface 540K, thereby forming a metal receiving area 543.

Accordingly, the metal receiving area 543 is formed in the inter-member path PQ1Q2R. Even when molten metal MM flows from the welded portion 552, this metal receiving area 543 receives the molten metal MM (solid metal KM), thereby preventing the molten metal MM from reaching the housing space 520S.

Embodiment 2

Next, Embodiment 2 will be described below with reference to FIGS. 15 to 20.

In the battery 1 and others of Embodiment 1 and Modified embodiments 1 to 5 mentioned above, the first member is the case body member of the case member and the second member is the closing member, and the case body member and the closing member are welded to each other at the welded portion.

On the other hand, a battery 600 of Embodiment 2 is a battery configured such that, in a case member used therein, a valve-holding closing member 640 (a valve holding member) is used as a first member and a safety valve member 650 is used as a second member, in which the closing member 640 and the safety valve member 650 are welded at a welded portion 672. Thus, Embodiment 2 is identical in battery structure and configuration and others to Embodiment 1 and Modified embodiments 1 to 5 mentioned above excepting the components corresponding to the first and second members of the invention. Therefore, the explanation of the identical parts or components to those of Embodiment 1 are omitted or simplified and the differences are mainly explained.

Figure 15:
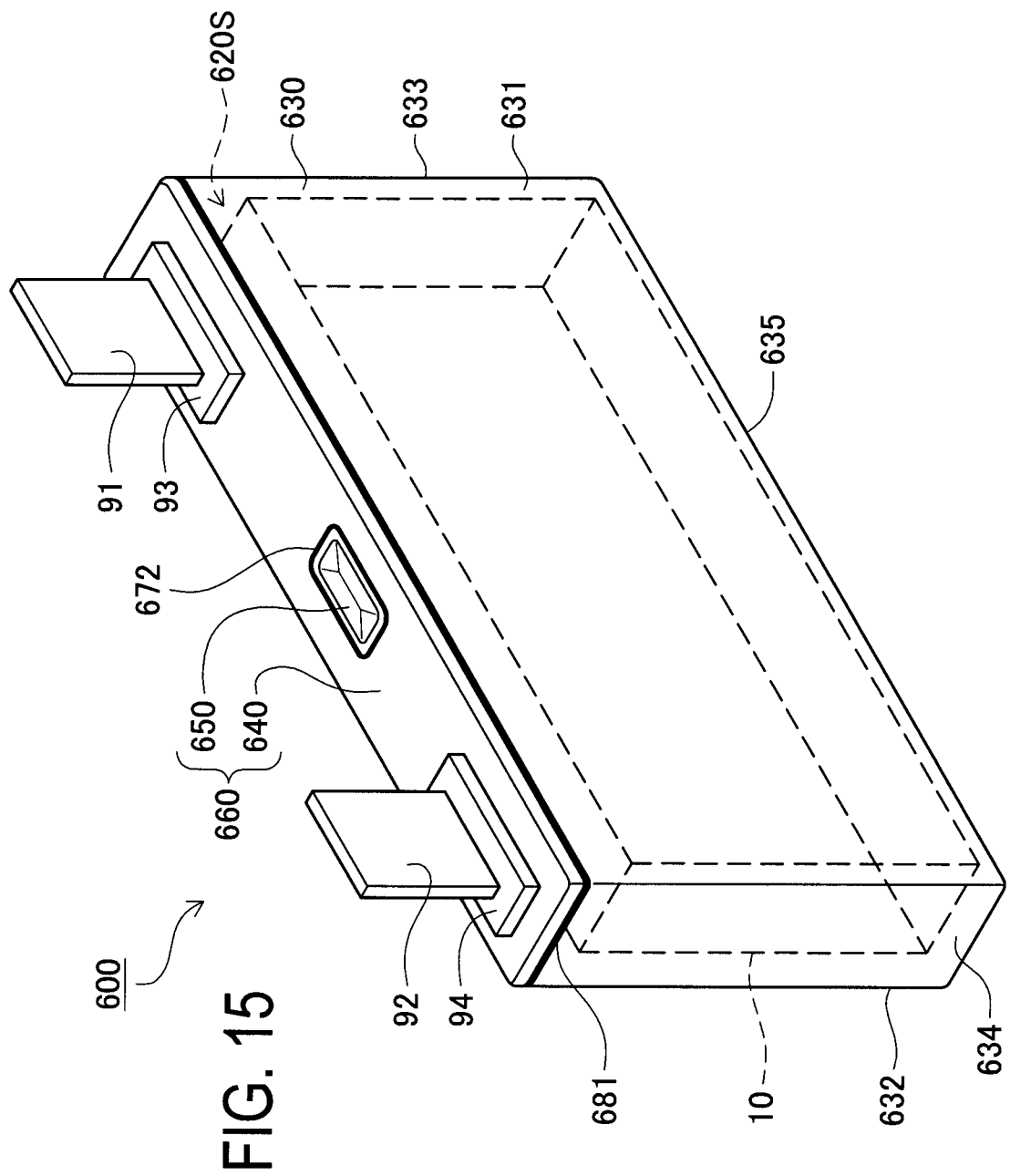
FIG. 15 is a perspective view of a battery of Embodiment 2.

The battery 600 of Embodiment 2 is a secondary battery as in Embodiment 1 mentioned above. This battery 600 is a rectangular cell having a substantially rectangular parallelepiped shape as shown in FIG. 15. This battery 600 includes the power generation element 10, a case body member 630 of a bottom-closed box shape for housing the power generation element 10 in a housing space 620S from an insertion opening (not shown) located on an insertion side (an upper side in FIG. 15) as with the case body member 30 of Embodiment 1, and a valve-mounting closing assembly 660. This closing assembly 660 further includes the safety valve member 650 and the valve-holding closing member 640 having a rectangular plate-like outer shape for holding the safety valve member 650 and closing the insertion opening of the case body member 630.

The valve-holding closing member 640 and the safety valve member 650 are fixed to each other by laser welding at a welded portion 672 over the entire circumference of the safety valve member 650 (see FIGS. 15 and 16).

The case body member 630 shown in FIG. 15 is made of aluminum and integrally formed in a bottom-closed tube shape by deep-drawing a material so that the insertion opening (not shown) is on the insertion side. This case body member 630 has a rectangular bottom part 635 and four, first, second, third, and fourth side parts 631, 632, 633, and 634 (hereinafter, also referred to as "first side part 631 et al.") each extending from four side of the bottom part 635 in a direction perpendicular to the bottom part 635. The first and second side parts 631 and 632 are largest side parts as shown in FIG. 15 and equal in shape and arranged in parallel with each other. The third and fourth side parts 633 and 634 are arranged individually between the first and second side parts 631 and 632 and in parallel with each other.

The insertion opening of this case body member 630 is closed by the valve-holding closing member 640. The case body member 630 and the valve-holding closing member 640 are fixed to each other by laser welding at a welded portion 681 over the entire circumference thereof (see FIG. 15).

The valve-holding closing member 640 of the closing assembly 660 is a rectangular plate-shaped closing member made of aluminum as shown in FIG. 15 and FIGS. 17A and 17B. This valve-holding closing member 640 has a valve mounting hole 641H having a rectangular shape elongated in a direction along the long side of the closing member 640 (a lower left to upper right direction in FIG. 15) as compared with a direction along the short side (an upper left to a lower right direction in FIG. 15) as seen in FIG. 15. The valve mounting hole 641H has four rounded corners (see FIGS. 17A and 17B). This valve mounting hole 641H is an opening for allowing the housing space 620S of the case body member 630 to communicate with the safety valve member 650.

The valve-holding closing member 640 has a valve-hole peripheral edge portion 641 provided annularly and having an opening end face 641T which contacts, along the entire circumference thereof, with a contact surface 651a of the valve contact portion 651 of the safety valve member 650 mentioned later when the safety valve member 650 is set to close the valve mounting hole 641H. This valve-hole peripheral edge portion 641 is configured to protrude stepwise from an inner peripheral surface 640b of the closing member 640 in a radial inward direction of the valve mounting hole 641H. In this valve-hole peripheral edge portion 641, the opening end face 641T is formed in a position lower than an outer surface 640a of the closing member 640 to form a space surrounded by the inner peripheral surface 640b in which the safety valve member 650 is fitted.

Furthermore, as shown in FIGS. 17A and 17B, this valve-hole peripheral edge portion 641 is formed with a groove 643 having a rectangular cross section recessed in a thickness direction (in a vertical direction in FIG. 17B) from the opening end face 641T, the groove 643 annularly extending in a circumferential direction. This groove 643 is a groove recessed at a depth Lm and, as mentioned later, serves as a metal receiving area for receiving a part of molten metal generated during welding of the closing member 640 and the safety valve member 650.

This valve-holding closing member 640 has, as with the closing member 40 of Embodiment 1, a positive terminal insertion hole and a negative terminal insertion hole (both not shown) for inserting the external positive terminal 91 and the external negative terminal 92 respectively.

The external positive terminal 91 connected to the positive electrode of the power generation element 10 protrudes outside through the positive terminal insertion hole while the terminal 91 is sealed liquid-tightly and electrically insulated from the closing member 640 by the seal member 93 molded in the positive terminal insertion hole.

On the other hand, the external negative terminal 92 connected to the negative electrode of the power generation element 10 protrudes outside through the negative terminal insertion hole while the terminal 92 is sealed liquid-tightly and electrically insulated from the closing member 640 by the seal member 94 molded in the negative terminal insertion hole.

Of the valve-mounting closing assembly 660, the safety valve member 650 is a plate-shaped valve member made of aluminum. This safety valve member 650 has a planar shape as shown in FIGS. 18A and 18B, i.e., an elongated rectangular shape with rounded corners to meet the shape of the inner peripheral surface 640b of the closing member 640. This safety valve member 650 includes a circumferential valve contact portion 651 on an outer peripheral side and a valve function portion 652 having a one-way safety valve function and positioned on a radially inward side of the valve contact portion 651.

The valve contact portion 651 has a contact surface 651*a* which contacts with the opening end face 641T of the edge portion 641 of the closing member 640 and an outer peripheral surface 651*b*.

On the other hand, the valve function portion 652 has the same shape as the valve mounting hole 641H of the closing member 640 in plan view. This valve function portion 651 has a split-openable portion 653 that can be split open by gas pressure when inner pressure of the housing space 620S exceeds a predetermined value, thereby releasing the gas out of the housing space 620S. This split-openable portion 653 has a V-shaped cross section which is thinner by a predetermined thickness than other portions of the valve function portion 652.

In the battery 600 of Embodiment 2, the closing member 640 closes the case body member 630 housing the power generation element 10 in the housing space 620S, the electrolyte is poured, and then the safety valve member 650 is fixed to the closing member 640 while gas-tightly closing the valve mounting hole 641H of the closing member 640. Specifically, the contact surface 651*a* of the valve contact portion 651 is placed in contact with the opening end face 641T of the peripheral edge portion 641, the closing member 640 and the safety valve member 650 are welded to each other by laser from outside around the inner peripheral surface 640*b* and the outer peripheral surface 651*b* over their entire circumferences, thereby forming a welded portion 672 between the closing member 640 and the safety valve member 650 (see FIGS. 15 and 16).

More details are explained.

Figure 19:
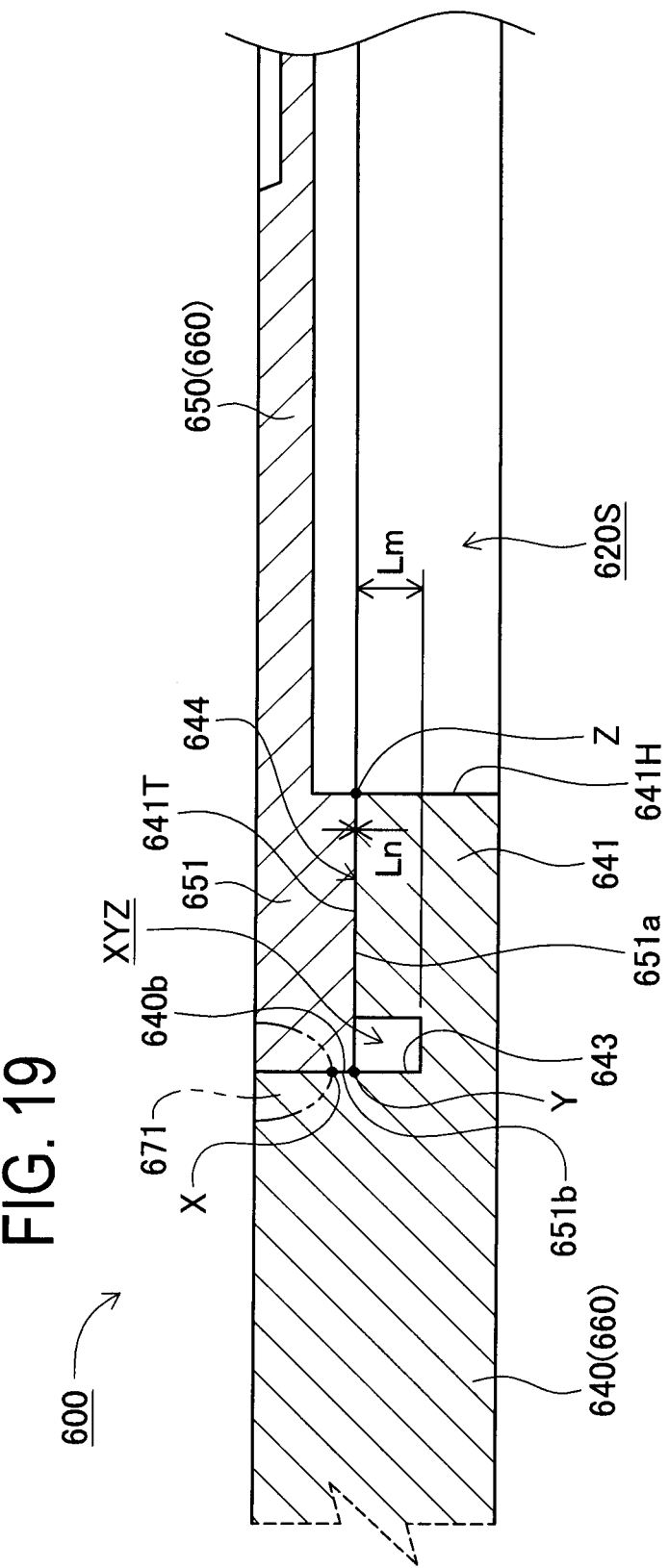
FIG. 19 an explanatory view to show a state of the battery of Embodiment 2 in which a valve-holding closing member and the safety valve member are not welded yet, corresponding to a view taken along a line D-D in FIG. 16.

As shown in FIG. 19, in this battery 600, when the opening end face 641T of the peripheral edge portion 641 is placed in contact with the contact surface 651*a* of the valve contact portion 651, closing the valve mounting hole 641H, a welding target portion (i.e., a to-be-welded portion) 671 and also an inter-member path XYZ are formed between the closing member 640 and the safety valve member 650.

In this Embodiment 2, this inter-member path XYZ is a path extending from a first point X located near a leading end (near a lower end in FIG. 19) of the welding target portion 671 on the outer peripheral surface 651*b*, passing a corner Y between the contact surface 651*a* and the outer peripheral surface 651*b* of the valve contact portion 651, to a second point Z to face the housing space 620S. The aforementioned groove 643 is formed to be recessed in the closing member 640 in this inter-member path XYZ as seen in FIG. 19.

Subsequently, a laser beam is irradiated to the welding target portion 671 indicated by a broken line in FIG. 19 to form the welded portion 672. At that time, a part of molten metal may flow toward the housing space 620S via the inter-member path XYZ. This flowing motion is different according to the laser welding conditions, the size of each portion in the inter-member path XYZ. In other words, there may be a case where molten metal hardly moves through the inter-member path XYZ and also a case where a large amount of molten metal moves through the inter-member path XYZ.

Figure 20:
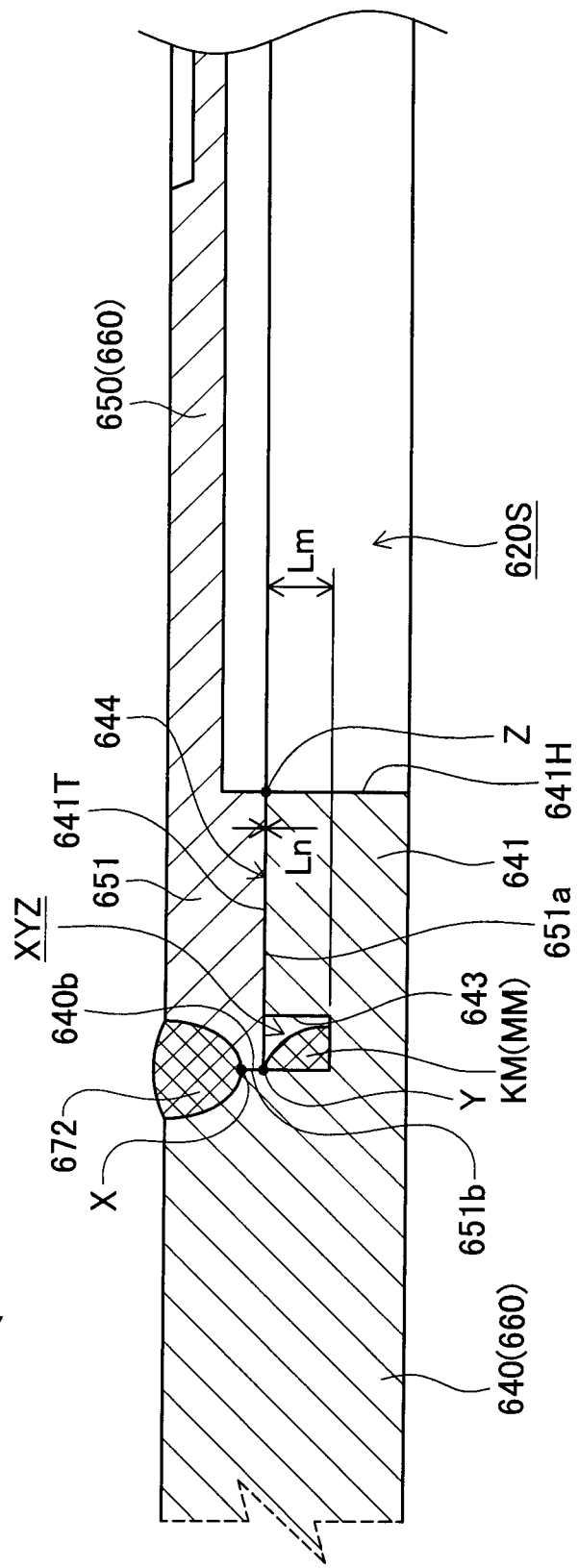
FIG. 20 is an explanatory view to show a state of the battery of Embodiment 2 after the valve-holding closing member and the safety valve member are welded, corresponding to a view taken along the line D-D in FIG. 16.

FIG. 20 shows the battery 600 of Embodiment 2 in which a part of molten metal MM generated during welding of the closing member 640 and the safety valve member 650 goes from the first point X to the groove 643 beyond the corner Y in the path inter-member XYZ. The molten metal MM reaching the groove 643 is solidified into solid metal KM.

As shown in FIG. 20, in the battery 600 in which the groove 643 is formed in the inter-member path XYZ, even when a part of the molten metal MM flows from the welded portion 672 toward the housing space 620S during welding of the closing member 640 and the safety valve member 650, the groove 643 can receive the part of the molten metal MM.

This battery 600 is therefore manufactured as the battery in which the molten metal MM was prevented from flowing to the housing space 620S.

In the battery 600 of Embodiment 2, furthermore, the groove 643 is formed in the peripheral edge portion 641 of the closing member 640 apart from the welded portion 672.

Accordingly, in the battery 600, the closing member 640 and the safety valve member 650 can be welded to each other by a similar welding work to a conventional case where the groove 643 is not provided, while the flowing of the molten metal MM to the housing space 620S can be prevented as mentioned above.

In Embodiment 2, the opening end face 641T of the peripheral edge portion 641 and the contact surface 651*a* of the valve contact portion 651 contact with each other but are not in completely close contact relation, so that many small clearance portions 644 are generated. This slight clearance Ln is smaller than the depth Lm of the groove 643, thereby especially preventing the molten metal MM from flowing to the housing space 620S through the small clearance portion 644. Consequently, the battery 600 can be provided in which the molten metal MM was restrained from reaching the housing space 620S.

It is to be noted that the clearance between the closing member 640 and the safety valve member 650 is changed stepwise from the depth Lm of the groove 643 to the depth Ln of each small clearance portion 644. Such remarkable difference in the clearance distance can prevent the molten metal MM from entering from the groove 643 into each small clearance portion 644.

Next, a method of manufacturing the battery 600 will be explained below with reference to FIGS. 15 to 19.

As to this battery 600, processes excepting a welding process the details of which will be mentioned later may be conducted using a well known technique and herein are omitted or simply explained. The following explanation is focused on the process.

In advance, the safety valve member 650 (see FIGS. 18A and 18B) and the closing member 640 (see FIGS. 17A and 17B) formed with the groove 643 in the peripheral edge portion 641 are prepared.

In a separate step, the external positive terminal 91 and the external negative terminal 92 are connected to the positive electrode (not shown) and the negative electrode (not shown) of the power generation element 10, respectively. Then, the external positive terminal 91 is inserted in the insertion hole (not shown) of the closing member 640 and the external negative terminal 91 is inserted in the insertion hole (not shown) of the closing member 640 respectively. The seal member 93 gas-tightly seals between the external positive terminal 91 and the insertion hole and the seal member 94 gas-tightly seals between the external negative terminal 92 and the insertion hole.

Successively, the power generation element 10 is inserted in the housing space 620S of the case body member 630, the insertion opening of the case body member 630 is closed by the closing member 640, and then the case body member 630 and the closing member 640 are fixed to each other at the welded portion 681. Then, a predetermined amount of electrolyte is poured in the housing space 620S.

A welding process of the safety valve member 650 is explained below.

In this welding process, as shown in FIG. 19, the contact surface 651*a* of the valve contact portion 651 of the safety valve member 650 is placed in close contact with the opening end face 641T of the peripheral edge portion 641 of the closing member 640. In this state, the laser beam is irradiated from outside in a thickness direction of the closing member 640 to the boundary between the closing member 640 and the valve contact portion 651 (the inner peripheral surface 640b and the outer peripheral surface 651b), i.e., to the welding target portion 671 indicated by a broken line. This laser beam is moved with respect to the closing member 640 and the safety valve member 650 in a circumferential direction of the valve member 650. Thus, the closing member 640 and the safety valve member 650 are welded to each other at the welded portion 672. The valve mounting hole 641H of the closing member 640 can therefore be closed by the safety valve member 650.

As above, the battery shown in FIG. 15 is completed.

Meanwhile, according to the welding conditions, the sizes of the closing member 640 and the safety valve member 650, and other states, there is a case where the molten metal MM generated during welding flows from the welded portion 672 toward the housing space 620S in the inter-member path XYZ formed between the closing member 640 and the safety valve member 650.

Even in this case, in Embodiment 2 including the groove 643 in the inter-member path XYZ, this groove 643 can receive a part of the molten metal MM even if flowing toward the housing space 620S (see FIG. 20). This makes it possible to prevent the molten metal MM from flowing over the groove 643 toward the housing space 620S.

Even when a part of molten metal MM flows over the groove 643 toward the housing space 620S, the amount thereof can be reduced. This can reduce the possibilities that the molten metal MM reaches the housing space 620S, the molten metal MM stays in the housing space 620S, and the part of the molten metal MM comes into a movable state, for example, into metal particles or grains tending to drop down into the housing space 620S.

In Embodiment 2, furthermore, the groove 643 is provided but placed apart from the welded portion 672 (the welding target portion 671). Accordingly, it is advantageous to weld the closing member 640 and the safety valve member 650 in the welding process by a similar work to a case where the groove 643 is not formed.

Embodiment 3

Next, Embodiment 3 will be described below with reference to FIGS. 21 to 22.

A vehicle 770 of Embodiment 3 mounts therein a battery pack 775 (the batteries 1) in which a plurality of the batteries 1 (see FIG. 1) of Embodiment 1 mentioned above is arranged in rows. The details related to the vehicle 770 are mainly explained below. The following explanations are therefore focused on differences from Embodiment 1 but are omitted or simplified about similar or identical components to those of Embodiment 1.

Figure 21:
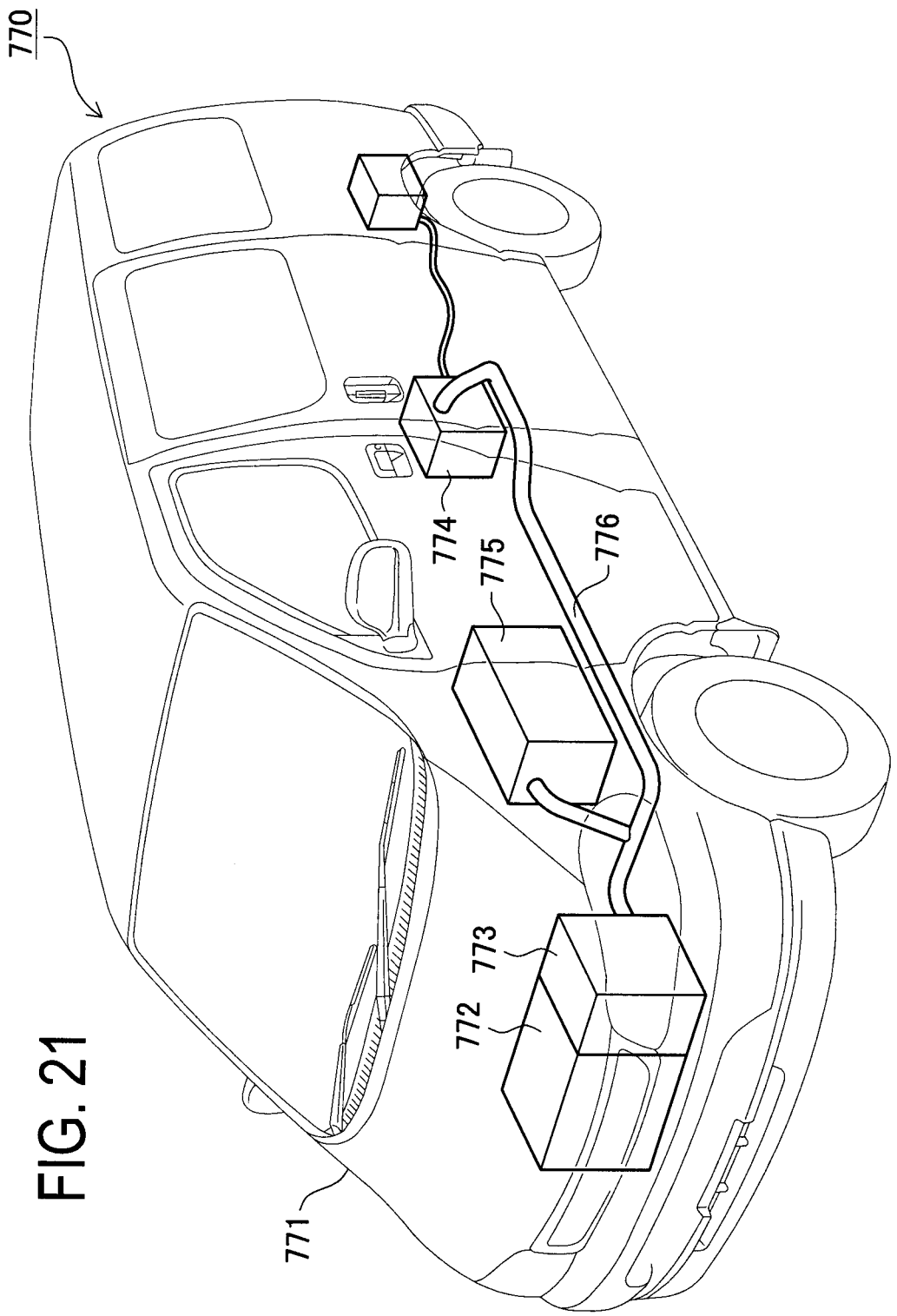
FIG. 21 is a perspective view of a vehicle of Embodiment 3.
Figure 22:
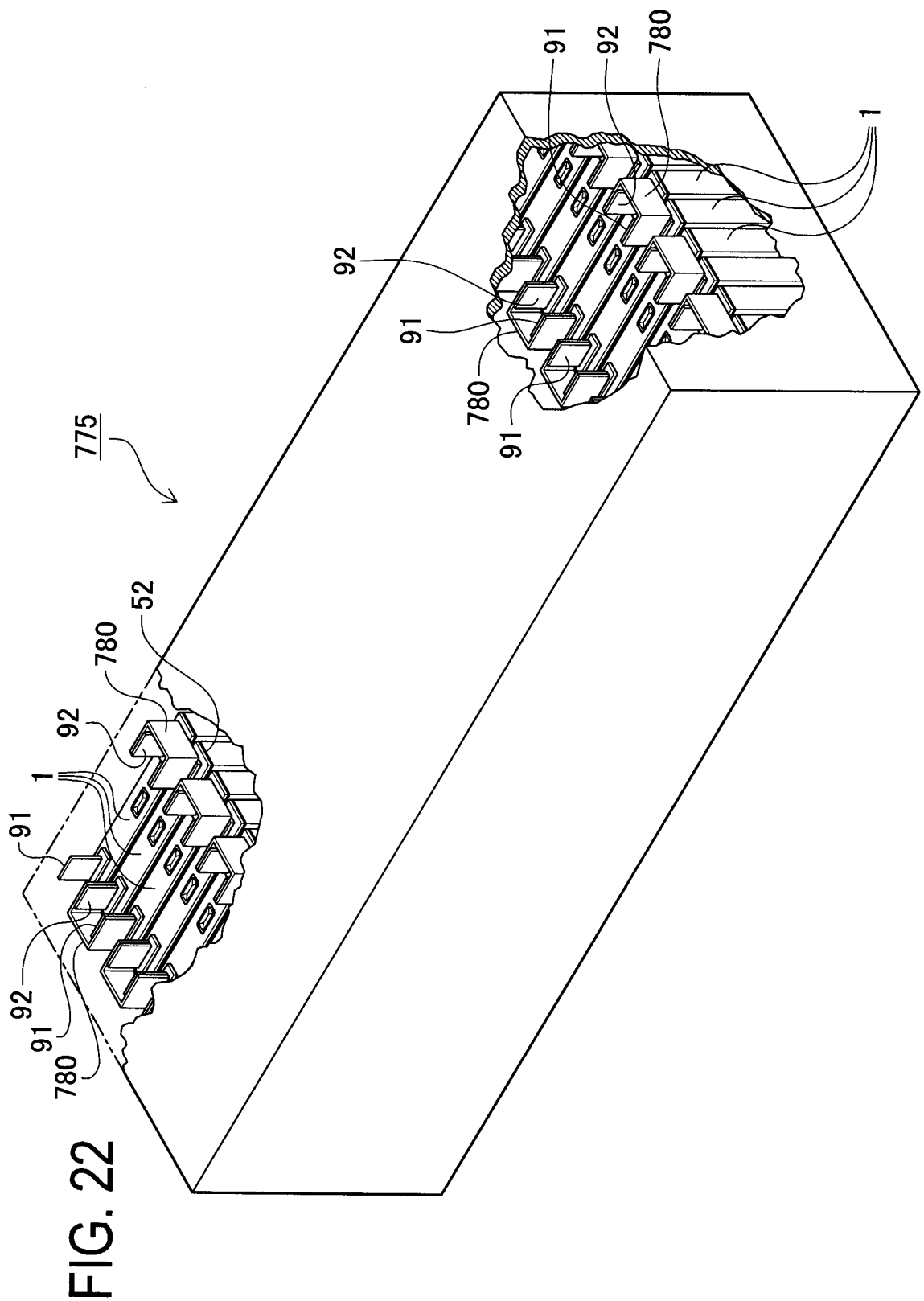
FIG. 22 is a perspective view of a battery pack mounted on the vehicle of Embodiment 3.

The vehicle 770 of Embodiment 3 is a hybrid electric vehicle to be driven by an engine 772 in combination with a front motor 773 and a rear motor 774 as shown in FIG. 21. This vehicle 770 includes a vehicle body 771, the engine 772, the front motor 773 attached to the engine 772, the rear motor 774, a cable 776, and the battery pack 775. This battery pack 775 is mounted in the vehicle body 771 of the vehicle 770 as shown in FIGS. 21 and 22. This battery pack 775 is configured so that the plurality of batteries 1 is arranged in rows as mentioned above.

The batteries 1 contained in this battery pack 775 are arranged so that positive electrodes (the positive terminals 91) and negative electrodes (the negative terminals 92) of adjacent batteries 1 are positioned alternately on opposite sides. The positive electrodes (the positive terminals 91) and the negative electrodes (the negative terminals 92) of the batteries 1 adjacently arranged are connected to each other by a bus bar 780. Thus, the batteries 1 are electrically connected in series. This battery pack 775 is connected to the front motor 773 and the rear motor 774 by the cable 776.

The vehicle 770 can be driven by the engine 772, front motor 773, and rear motor 774 by a known means using the battery pack 775 as power sources of the front motor 773 and the rear motor 774.

As mentioned above, in each battery 1 contained in the battery pack 775, the circumferential groove 43 is formed in the inner part 42 of the closing member 40 in the inter-member path PR. The small clearance portion 44 having the clearance distance Ln is also provided on the housing space 20S side relative to the groove 43.

In the vehicle 770 of Embodiment 3, as above, the battery 1 used therein is configured so that a part of molten metal MM generated during welding of the case body member 30 and the closing member 40 was prevented from flowing into the housing space 20S.

In the battery 1 (the battery pack 775) in which a part of the molten metal MM was prevented from flowing to the housing space 20S, the possibilities of a short circuit between the positive electrode and the negative electrode in the power generation element 10 and deterioration in battery characteristics can be reduced. Therefore, the vehicle 770 can have high reliability and run excellently.

The above explanations are made on the invention with reference to Embodiments 1 to 3 and Modified embodiments 1 to 5. The invention however is not limited to the above embodiments and modified embodiments and may be modified or changed appropriately within a scope of the invention.

In Embodiment 1, for example, the groove 43 is formed as a recess circumferentially extending in a peripheral direction in the inner part 42 of the closing member 40. Alternatively, the metal receiving area may be formed partly, like a broken line, in the circumferential direction of the circumferential welded portion.

In Embodiments 1 and 2 and Modified embodiments 1 to 5, the state where the molten metal MM (solid metal KM) is received in the groove 43, the metal receiving area 243, or others is shown in FIGS. 6 to 11B, 13, and 20.

However, in the battery of the invention, the molten metal does not always need to be received in the metal receiving area. Because the tendency of the molten metal to flow may be changed according to changes in welding conditions, size variations of the first and second members, and changes in contact or fitting state of the first and second members. Accordingly, in the case where several conditions appear at the same time, the molten metal is caused to flow or a flow amount or a flowing distance increases. The invention a battery including the metal receiving area formed in preparation for such case. In other words, there are included batteries such as a battery having the metal receiving area but the molten metal did not flow from the welded portion, a battery in which the molten metal flowed from the welded portion but did not reach the metal receiving area, and others, even though in some batteries the molten metal is not always received or accumulated in the metal receiving area. Other batteries are also included if only the metal receiving area is formed, in which the molten metal is received in this metal receiving area and further the molten metal exists beyond the metal receiving area toward the housing space.

In Embodiments 1 and 2 and Modified embodiments 1 to 5, the first member (e.g., the case body member 30) and the second member (e.g., the closing member 40) are welded to each other by laser. As the technique of welding the first and second members, for example, electron beam welding or other welding means can be adopted.

In Embodiment 3, the vehicle 770 is the hybrid electric vehicle. However, the kinds of vehicles mounting the batteries may include an electric vehicle, a motorbike or motorcycle, a forklift, electric scooter, a railroad vehicle, etc.

Furthermore, Embodiment 3 exemplifies the vehicle 770 mounting the battery 1 of Embodiment 1. Alternately, the vehicle may mount the battery 600 of Embodiment 2, the batteries 100, 200, or others of Modified embodiments 1 to 5. The kind and the number of the battery mounted in the vehicle may be changed appropriately.

The invention claimed is:

1. A battery comprising:
a power generation element; and
a case member having a housing space for housing the power generation element therein;
wherein the case member includes:
a first member forming an opening of the housing space; and
a second member which closes the opening of the first member,
wherein the first and second members are welded to each other at a welded portion formed in the first and second members,
wherein at least one of the first and second members is formed with a metal receiving area in an inter-member path between the first and second members to extend from the welded portion to the housing space, the metal receiving area being configured to receive a part of molten metal generated during welding,
wherein the first and second members are provided with a clearance portion in the inter-member path on the side from the metal receiving area to the housing space, the clearance portion being smaller than a clearance at the metal receiving area between the first and second members, and
wherein the metal receiving area is formed along an entire circumference of the opening of the first member.

2. The battery according to claim 1, wherein the metal receiving area is formed to be recessed in at least one of the first and second members.

3. The battery according to claim 1, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

4. The battery according to claim 1, wherein
the second member is a safety valve member,
the first member is a valve holding member for holding the safety valve member, and
the opening of the housing space is a valve hole through which the housing space is communicated with the safety valve member.

5. A vehicle mounting the battery according to claim 1.

6. A method of manufacturing a battery comprising:
a power generation element; and
a case member having a housing space for housing the power generation element therein;
wherein the case member includes:
a first member forming an opening of the housing space; and
a second member which closes the opening of the first member,
wherein the first and second members are welded to each other at a welded portion formed in the first and second members,
wherein at least one of the first and second members is formed with a metal receiving area in an inter-member path between the first and second members to extend from the welded portion to the housing space, the metal receiving are being configured to receive a part of molten metal generated during welding,
wherein the first and second members are provided with a clearance portion in the inter-member path on the side from the metal receiving area to the housing space, the clearance portion being smaller than a clearance at the metal receiving area between the first and second members, and
wherein the metal receiving area is formed along an entire circumference of the opening of the first member.

7. The battery manufacturing method according to claim 6, wherein the metal receiving area is formed to be recessed in at least one of the first and second members.

8. The battery manufacturing method according to claim 6, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

9. The battery manufacturing method according to claim 6, wherein the second member is a safety valve member,
the first member is a valve holding member for holding the safety valve member, and
the opening of the housing space is a valve hole through which the housing space is communicated with the safety valve member.

10. The battery according to claim 1, wherein
the metal receiving area is formed to be recessed in at least one of the first and second members.

11. The battery according to claim 1, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

12. The battery according to claim 2, wherein
the opening of the housing space is a housing opening forming a path for insertion of the power generation element in the housing space,
the first member is a case body member having a bottom-closed tube shape and including side parts that define the housing opening, and the second member is a closing member which closes the housing opening of the case body member, the closing member having a circumferential contact portion which contacts the side parts of the case body member.

13. The battery according to claim 10, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

14. The battery manufacturing method according to claim 6, wherein the metal receiving area is formed to be recessed in at least one of the first and second members.

15. The battery manufacturing method according to claim 6, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

16. The battery manufacturing method according to claim 7, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

17. The battery manufacturing method according to claim 14, wherein
the opening of the housing space is a housing opening forming a path for insertion of the power generation element in the housing space,
the first member is a case body member having a bottom-closed tube shape and including side parts that define the housing opening, and
the second member is a closing member which closes the housing opening of the case body member, the closing member having a circumferential contact portion which contacts the side parts of the case body member.

* * * * *